(12) United States Patent
Harding et al.

(10) Patent No.: US 12,551,663 B2
(45) Date of Patent: Feb. 17, 2026

(54) PROBE DELIVERY DEVICE TO FACILITATE ADVANCEMENT OF A PROBE WITHIN AN INTRAVENOUS CATHETER

(71) Applicant: Becton, Dickinson and Company, Franklin Lakes, NJ (US)

(72) Inventors: Weston F. Harding, Lehi, UT (US); Jonathan Karl Burkholz, Salt Lake City, UT (US); Curtis H. Blanchard, Riverton, UT (US); Megan Scherich, Salt Lake City, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 978 days.

(21) Appl. No.: 17/570,566

(22) Filed: Jan. 7, 2022

(65) Prior Publication Data
US 2022/0218956 A1   Jul. 14, 2022

Related U.S. Application Data

(60) Provisional application No. 63/135,393, filed on Jan. 8, 2021.

(51) Int. Cl.
*A61M 25/06* (2006.01)
*A61M 25/01* (2006.01)

(52) U.S. Cl.
CPC .... *A61M 25/0631* (2013.01); *A61M 25/0113* (2013.01); *A61M 2025/015* (2013.01)

(58) Field of Classification Search
CPC ........ A61M 25/0113; A61M 25/09041; A61M 25/0102; B65H 75/4426; B65H 75/4428
See application file for complete search history.

(56) References Cited

U.S. PATENT DOCUMENTS

| | | |
|---|---|---|
| 10,092,731 B2 | 10/2018 | Almansouri et al. |
| 11,724,083 B2 | 8/2023 | Spataro et al. |
| 2015/0051688 A1 | 2/2015 | Cummins |
| 2015/0057739 A1* | 2/2015 | Costello ............... A61F 2/9517 623/1.11 |
| 2016/0082233 A1 | 3/2016 | Ha et al. |
| 2016/0121086 A1 | 5/2016 | Castro et al. |
| 2017/0296792 A1 | 10/2017 | Ornelas Vargas et al. |
| 2018/0021545 A1 | 1/2018 | Mitchell et al. |

(Continued)

FOREIGN PATENT DOCUMENTS

| | | |
|---|---|---|
| CN | 110536661 A | 12/2019 |
| JP | 2008272262 A | 11/2008 |

(Continued)

*Primary Examiner* — Courtney B Fredrickson
*Assistant Examiner* — Kayla M. Turkowski
(74) *Attorney, Agent, or Firm* — The Webb Law Firm

(57) ABSTRACT

A probe delivery device can include a probe delivery mechanism that facilitates advancing a probe through an IV catheter. The probe delivery mechanism can be housed within a compartment of the probe delivery device and can include a probe that extends from the compartment into a fluid pathway formed within the probe delivery device. A portion of the probe delivery mechanism can extend out from the housing to enable a clinician to advance and retract the probe. The probe delivery device may include a vacuum tube receiver or a connector to enable a blood draw or fluid injection to be performed using the probe delivery device.

5 Claims, 28 Drawing Sheets

(56) References Cited

U.S. PATENT DOCUMENTS

| | | |
|---|---|---|
| 2019/0232027 A1 | 8/2019 | Chu |
| 2019/0240467 A1 | 8/2019 | Ha et al. |
| 2019/0321595 A1 | 10/2019 | Spataro et al. |
| 2021/0290905 A1 | 9/2021 | Harding et al. |

FOREIGN PATENT DOCUMENTS

| | | |
|---|---|---|
| JP | 2017527409 A | 9/2017 |
| WO | 2020214823 A1 | 10/2020 |

* cited by examiner

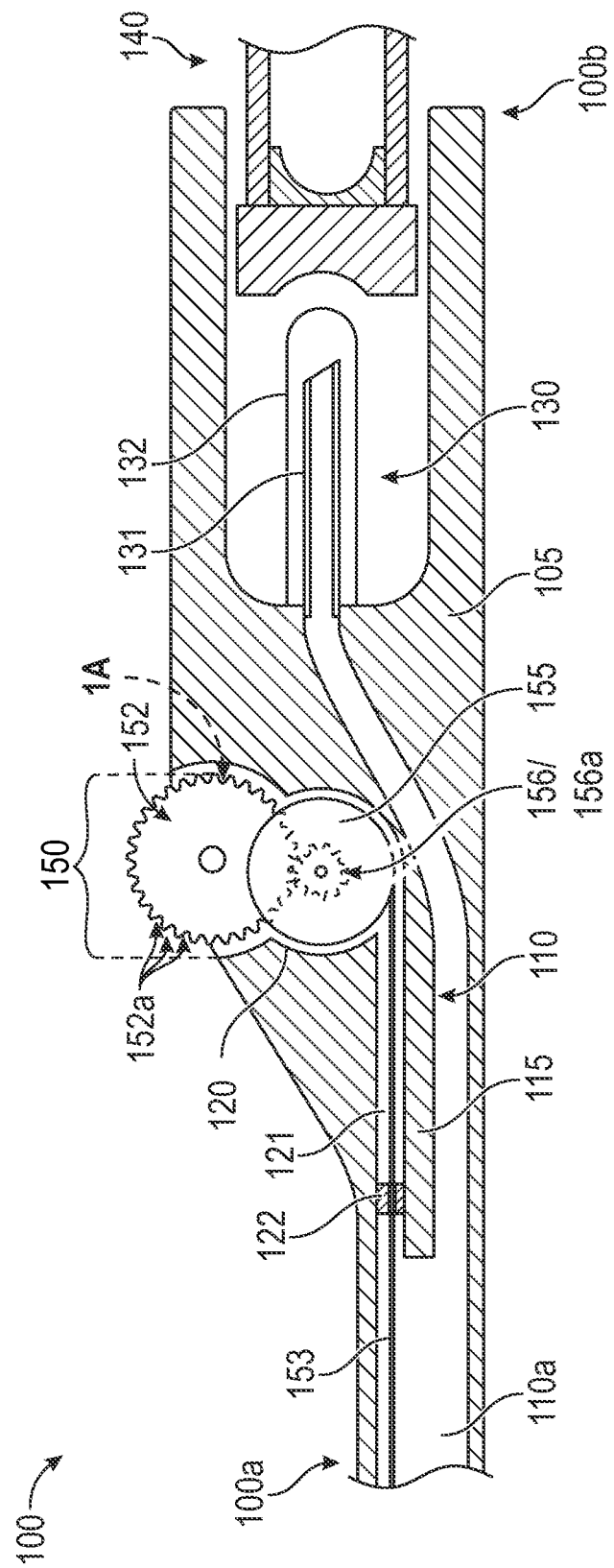

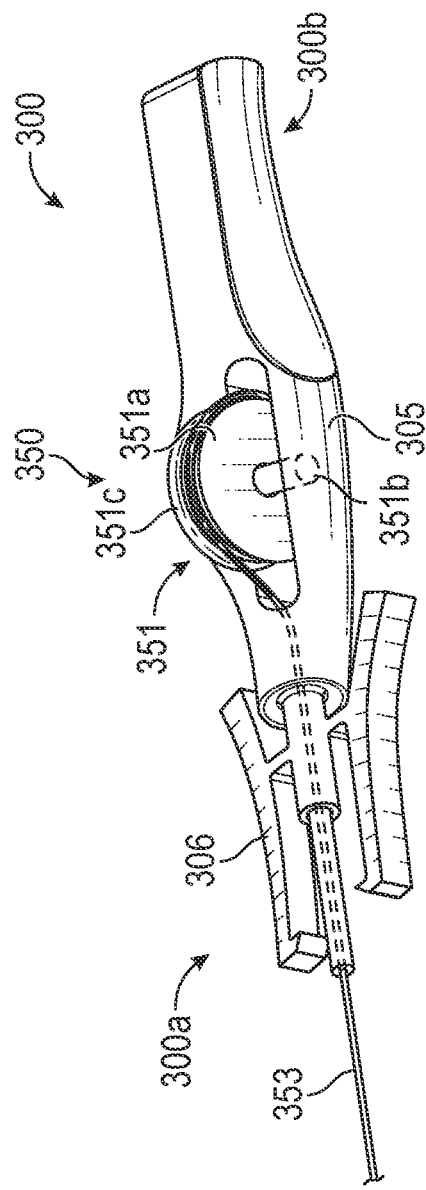
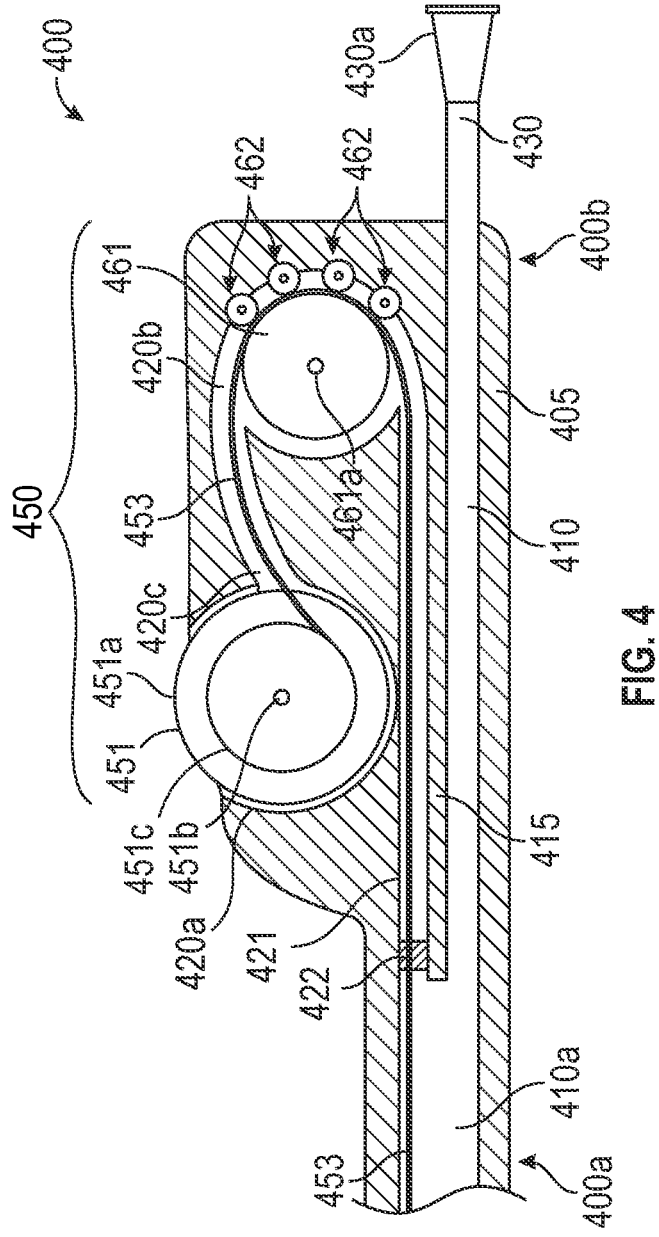

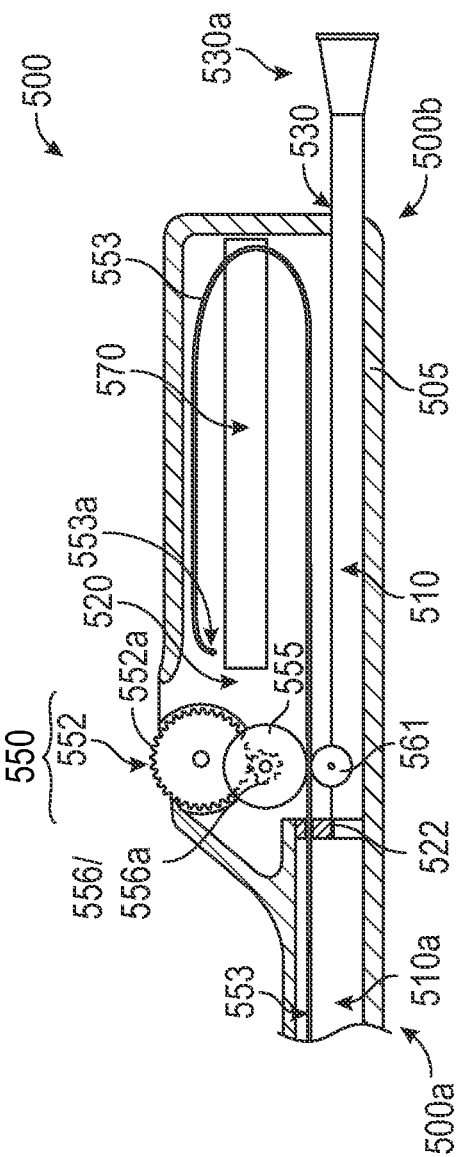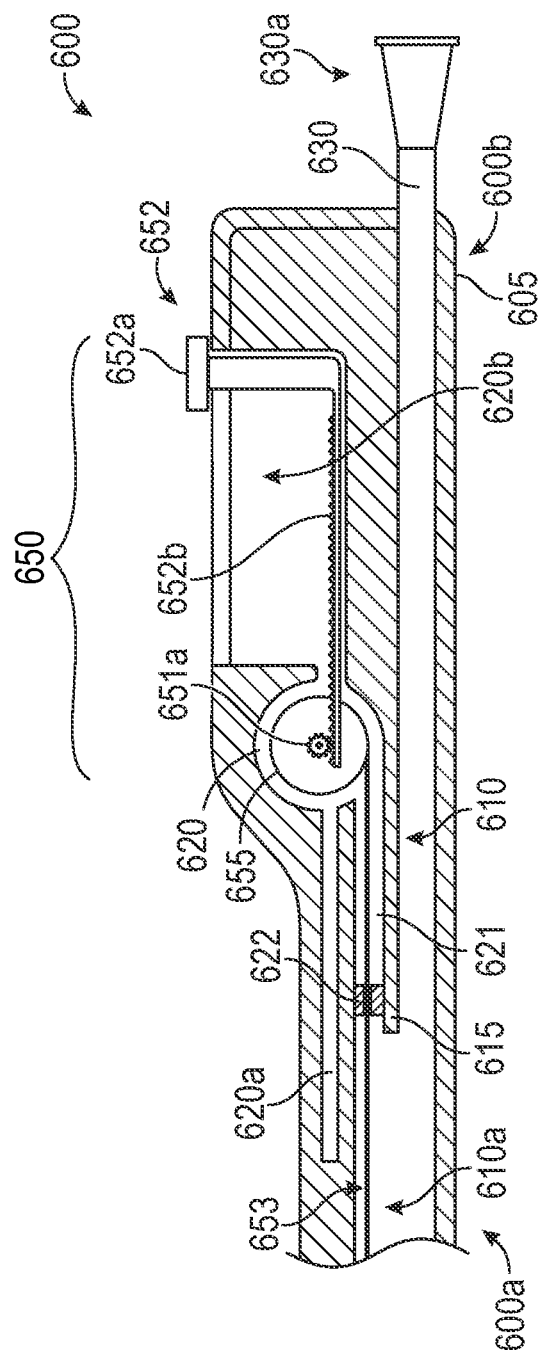

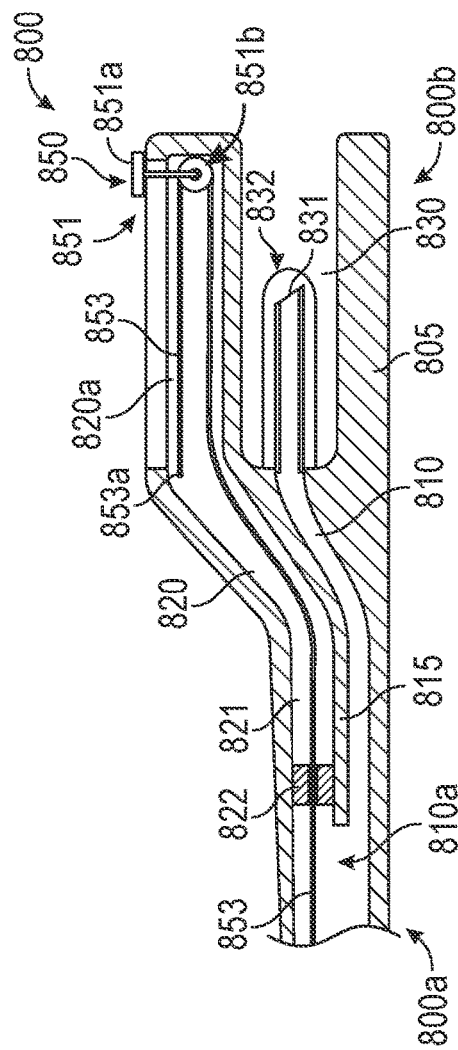
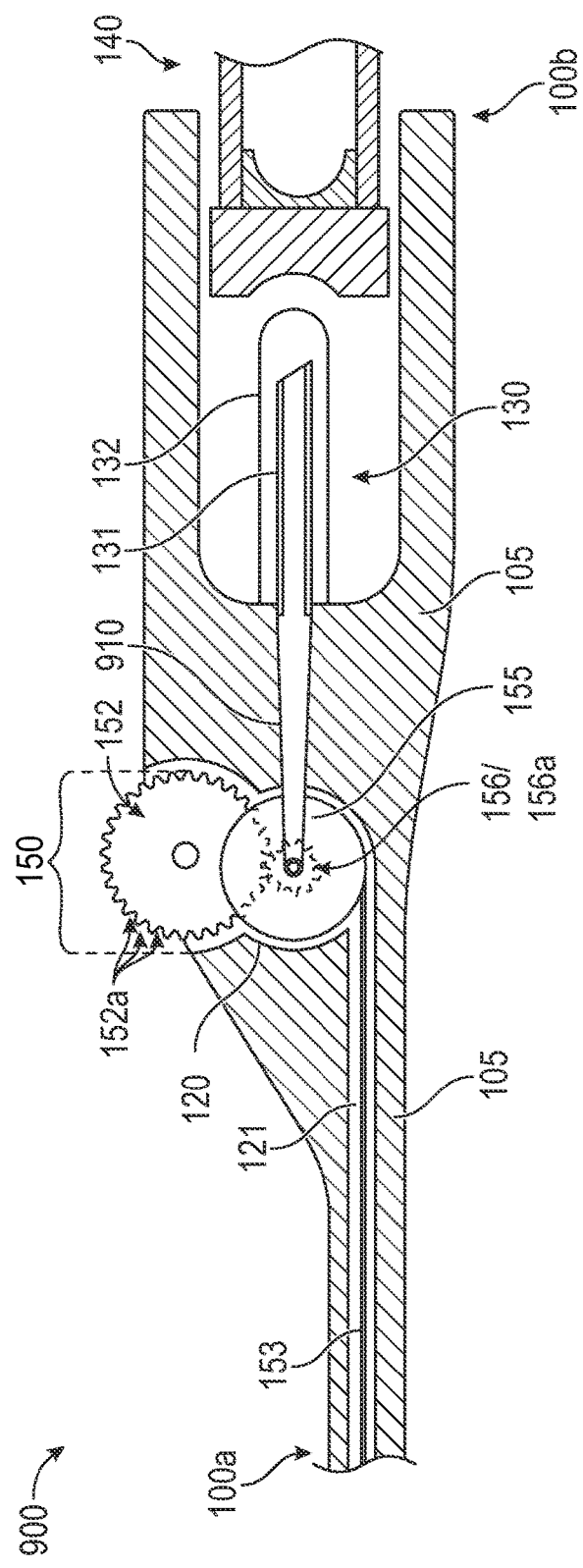
FIG. 8
FIG. 9

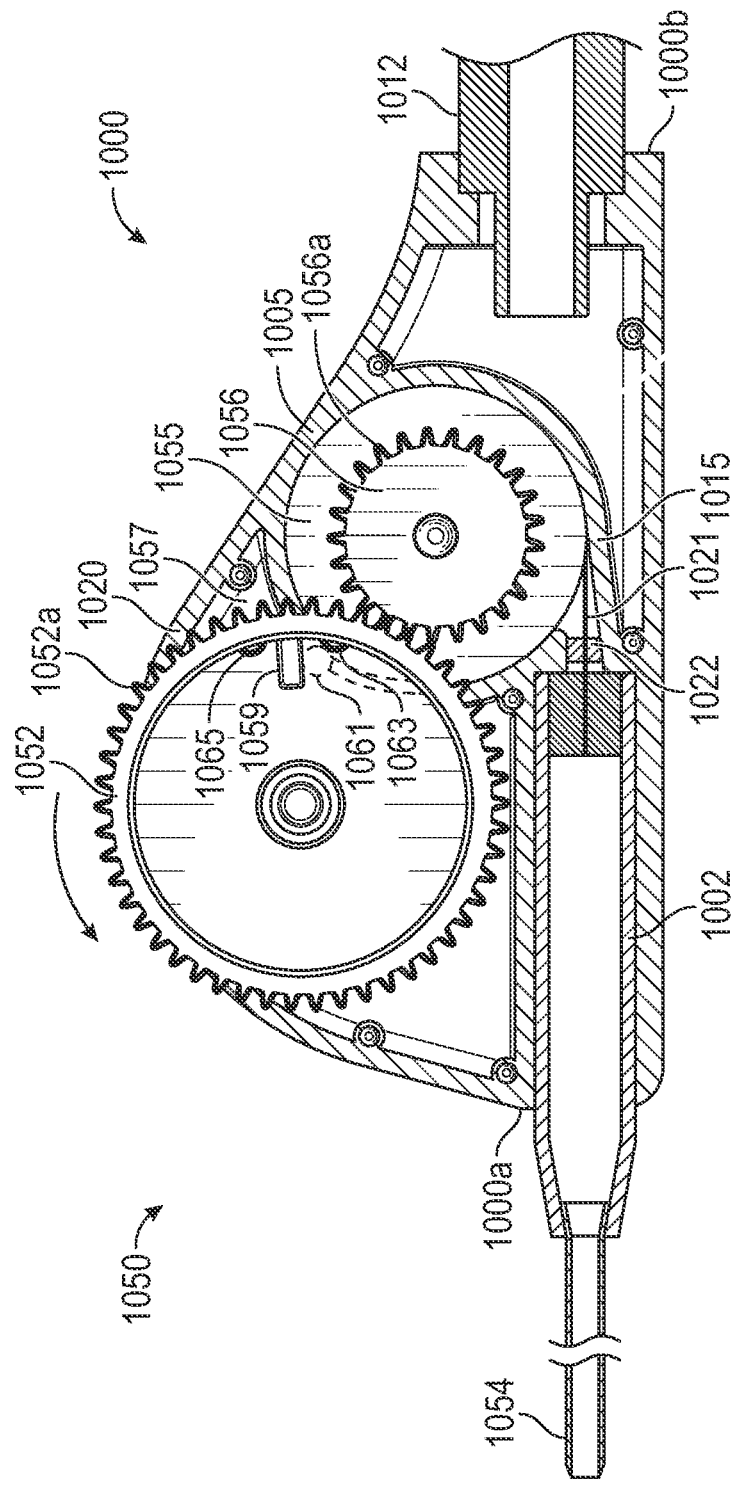

PROBE DELIVERY DEVICE TO FACILITATE ADVANCEMENT OF A PROBE WITHIN AN INTRAVENOUS CATHETER

CROSS-REFERENCE TO RELATED APPLICATION

This application claims priority to U.S. Provisional Application No. 63/135,393, filed Jan. 8, 2021, which is hereby incorporated by reference in its entirety.

BACKGROUND

A catheter is commonly used to infuse fluids into vasculature of a patient. For example, the catheter may be used for infusing normal saline solution, various medicaments, or total parenteral nutrition. The catheter may also be used for withdrawing blood from the patient.

The catheter may include an over-the-needle peripheral intravenous ("IV") catheter. In this case, the catheter may be mounted over an introducer needle having a sharp distal tip. The catheter and the introducer needle may be assembled so that the distal tip of the introducer needle extends beyond the distal tip of the catheter with the bevel of the needle facing up away from skin of the patient. The catheter and introducer needle are generally inserted at a shallow angle through the skin into vasculature of the patient.

In order to verify proper placement of the introducer needle and/or the catheter in the blood vessel, a clinician generally confirms that there is "flashback" of blood in a flashback chamber of a catheter assembly that includes the catheter. After placement of the needle has been confirmed, the clinician may remove the needle, leaving the catheter in place for future blood withdrawal or fluid infusion.

Catheters typically provide an access port by which other devices may obtain access to the catheter while the catheter is positioned in a patient's vasculature. These other devices may be employed to perform various tasks such as obtaining a blood sample, injecting a fluid, performing a measurement, monitoring, etc. In many instances, the catheter of an IV catheter device may become occluded (e.g., due to a thrombus or fibrin sheath) which may prevent the performance of such tasks. If the catheter has become occluded, a clinician may attempt to remove the occlusion such as by inserting a needle, wire, or other structure through the catheter. However, removing an occlusion using currently available techniques is not always effective, is oftentimes difficult to perform, and may cause trauma to the vasculature of the patient.

The subject matter claimed herein is not limited to embodiments that solve any disadvantages or that operate only in environments such as those described above. Rather, this background is only provided to illustrate one example technology area where some implementations described herein may be practiced.

SUMMARY

The present disclosure relates generally to probe delivery devices to facilitate advancement and/or retraction of a probe within an IV catheter, as well as related systems and methods. In some embodiments, a probe delivery device may include a housing, which may include a distal end and a proximal end. In some embodiments, the distal end of the housing may be configured to couple to an intravenous (IV) catheter device.

In some embodiments, an inner surface of the housing may include a stop member. In some embodiments, the probe delivery device may include a spool disposed within the housing and a probe wound around the spool. In some embodiments, the probe delivery device may include an advancement wheel. In some embodiments, the advancement wheel may extend out from the housing. In some embodiments, in response to the advancement wheel being rotated, the spool may rotate to cause the probe to advance through the distal end of the housing. In some embodiments, an outer surface of the advancement wheel may include another stop member configured to contact the stop member and stop rotation of the advancement wheel more than a full turn.

In some embodiments, the stop member and/or the other stop member may include a protrusion. In some embodiments, the housing may include a fluid pathway extending through the distal end and the proximal end of the housing. In some embodiments, the housing may include a probe channel that extends from the spool to the fluid pathway. In some embodiments, the probe delivery device may include a seal that isolates the probe channel from the fluid pathway, and the probe may extend through the seal. In some embodiments, the proximal end of the housing may include a Luer connector or another suitable type of connector.

In some embodiments, a probe delivery device may include a housing, which may include a distal end and a proximal end. In some embodiments, the distal end of the housing may be configured to couple to an intravenous catheter device. In some embodiments, an inner surface of the housing may include a housing stop member.

In some embodiments, the probe delivery device may include a first wheel. In some embodiments, an inner surface of the first wheel may include a first wheel stop. In some embodiments, the probe delivery device may include a second wheel, which may include a tab. In some embodiments, in response to the probe delivery device being disposed in a first configuration, the first wheel and/or the second wheel may be prevented from rotating in a first direction. In some embodiments, in response to the probe delivery device being disposed in a first configuration, the first wheel and/or the second wheel may be configured to rotate in a second direction opposite the first direction. In some embodiments, the first wheel may be configured to rotate more than one full turn in the second direction.

In some embodiments, a gap may be disposed between the housing stop and the first wheel stop. In some embodiments, in response to the probe delivery device being disposed in a first configuration, the tab may bridge the gap between the housing stop and the first wheel stop. In some embodiments, in response to the probe delivery device being disposed in the first configuration, the tab may be disposed between the housing stop member and the first wheel stop member and may contact the housing stop member and the first wheel stop member. In some embodiments, in response to the probe delivery device being disposed in the first configuration, the first wheel may be configured to rotate independent from the housing and the second wheel in the second direction until the first wheel stop member contacts the tab.

In some embodiments, in response to the first wheel rotating independent from the housing and the second wheel in the second direction until the first wheel stop member contacts the tab, the first wheel and the second wheel are configured to rotate together further in the second direction until the probe delivery device is disposed in a second configuration. In some embodiments, in the second configuration, the tab may be disposed between the housing stop member and the first wheel stop member and may contact the housing stop member and the first wheel stop member.

In some embodiments, the probe delivery device may include a probe. In some embodiments, the probe may be in a fully retracted position in response to the probe delivery device being in the first configuration. In some embodiments, the probe may be in a fully advanced position in response to the probe delivery device being in the second configuration. In some embodiments, the first wheel may be configured to rotate in the second direction to advance the probe in a distal direction through the distal end of the housing.

In some embodiments, a probe delivery device may include a housing, which may include a distal end and a proximal end. In some embodiments, the distal end may be configured to couple to an IV catheter device. In some embodiments, an inner surface of the housing may include a housing stop member and a housing detent. In some embodiments, the probe delivery device may include an axle. In some embodiments, the probe delivery device may include a first wheel configured to rotate with the axle. In some embodiments, an inner surface of the first wheel may include a first wheel stop member and a first wheel detent.

In some embodiments, the probe delivery device may include a second wheel disposed on the axle and configured to rotate with the axle and move axially along the axle. In some embodiments, the second wheel may include a tab. In some embodiments, in response to the probe delivery device being in a first configuration, the tab may be disposed within the housing detent and the first wheel detent. In these embodiments, the first wheel may be prevented from rotating in a first direction but may be configured to rotate in a second direction opposite the first direction. In some embodiments, the first wheel may be configured to rotate more than one full turn in the second direction.

In some embodiments, the probe delivery device may include a probe. In some embodiments, the first wheel may be configured to rotate in the second direction to advance the probe in a distal direction through the distal end of the housing. In some embodiments, in response to the first wheel rotating in the second direction from the first configuration, the tab may be removed from the first wheel detent before the tab is removed from the housing detent. In some embodiments, the tab may be removed from the housing detent in response to the tab sliding toward the inner surface of the first wheel.

In some embodiments, the inner surface of the housing may include another housing detent. In some embodiments, the inner surface of the first wheel may include a first wheel ramped surface. In some embodiments, the first wheel detent may be disposed between the first wheel stop member and the first wheel ramped surface. In some embodiments, the first wheel ramped surface may be ramped towards the first wheel detent.

In some embodiments, the first wheel may be configured to rotate from the first configuration to a second configuration. In some embodiments, the tab may be disposed within the other housing detent and the first wheel detent in the second configuration. In some embodiments, in order to move from the first configuration to the second configuration, the tab may contact the housing stop member. In some embodiments, in response to the tab contacting the housing stop member and further rotation of the first wheel in the second direction, the tab may move along the first wheel ramped surface and may be pushed by the first wheel ramped surface towards the inner surface of the housing and into the other housing detent.

In some embodiments, the inner surface of the housing may include a housing ramped surface and another housing ramped surface. In some embodiments, the housing detent may be disposed between the housing stop member and the housing ramped surface. In some embodiments, the other housing detent may be disposed between the housing stop member and the other ramped surface and on an opposite side of the housing stop member as the housing detent.

In some embodiments, the housing ramped surface may be ramped towards the housing detent. In some embodiments, the first wheel ramped surface may be ramped towards the first wheel detent. In some embodiments, the housing ramped surface and the first wheel ramped surface may be ramped in differing or opposing directions. In some embodiments, the housing detent may be disposed across from the first wheel detent in the first configuration.

It is to be understood that both the foregoing general description and the following detailed description are examples and explanatory and are not restrictive of the invention, as claimed. It should be understood that the various embodiments are not limited to the arrangements and instrumentality illustrated in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE DRAWINGS

Example embodiments will be described and explained with additional specificity and detail through the use of the accompanying drawings in which:

FIG. 1 is a cross-sectional side view of a probe delivery device, according to some embodiments;

FIG. 3 is a top perspective view of another probe delivery device, according to some embodiments;

FIG. 4 is a cross-sectional side view of another probe delivery device, according to some embodiments;

FIG. 5 is a cross-sectional side view of another probe delivery device, according to some embodiments;

FIG. 6 is a cross-sectional side view of another probe delivery device, according to some embodiments;

FIG. 8 is a cross-sectional side view of another probe delivery device, according to some embodiments;

FIG. 9 is a cross-sectional side view of another probe delivery device, according to some embodiments;

FIG. 10A is a cross-sectional side view of another probe delivery device, illustrating the probe delivery device in a first configuration, according to some embodiments;

DESCRIPTION OF EMBODIMENTS

Figure 1A:
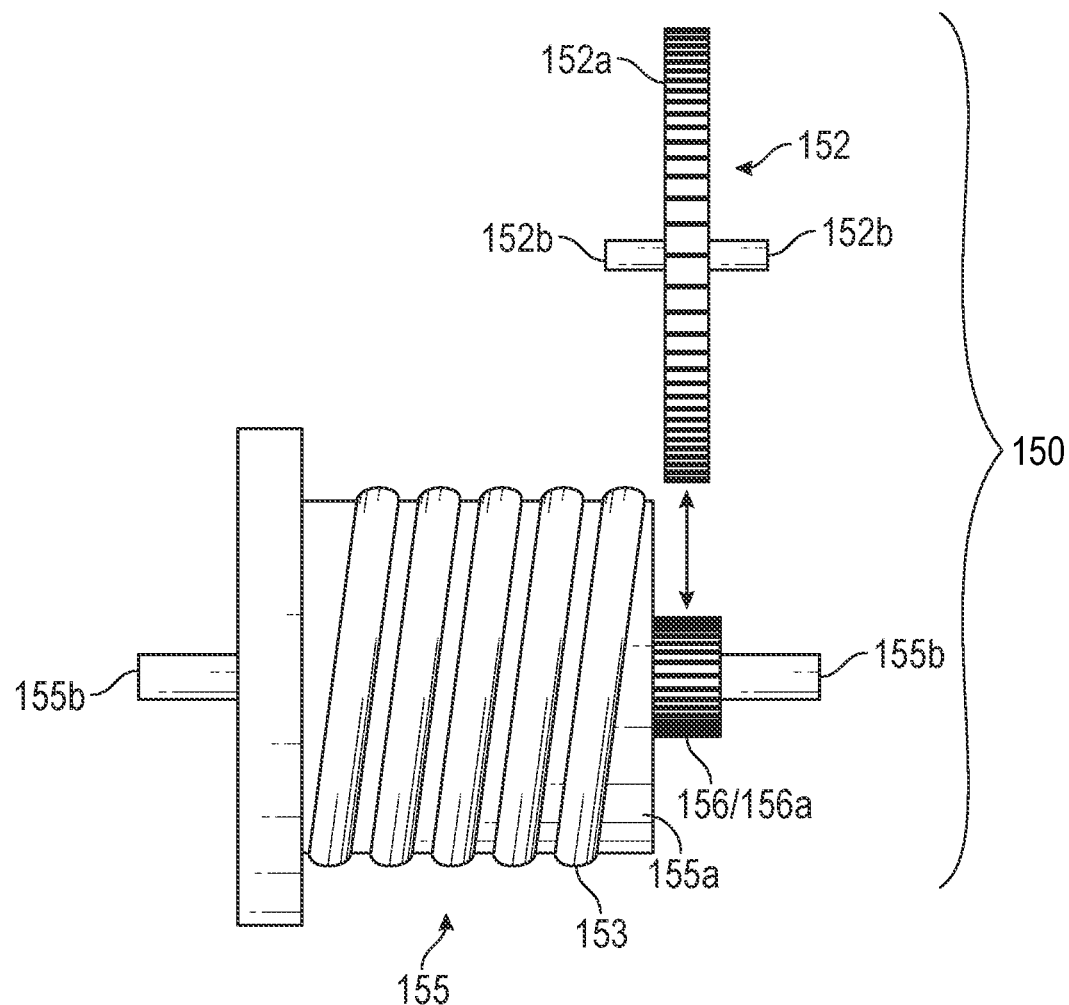
FIG. 1A is an exploded rear view of an example probe advancement mechanism of the probe delivery device of FIG. 1.

In the specification and the claims, the term "IV catheter device" should be construed as any device that includes an IV catheter. The term "probe delivery device" should be construed as any device that is configured to advance and/or retract a probe within an IV catheter. In some embodiments, a probe delivery device may be a separate device from an IV catheter device with which the probe delivery device may be used. In other embodiments, a probe delivery device may be in the form of an IV catheter device. In other words, a probe delivery device may include an IV catheter in some embodiments. The term "probe delivery mechanism" will be used to represent a variety of mechanisms and/or configurations of a probe delivery device that facilitate advancement and/or retraction of a probe within an IV catheter in accordance with embodiments of the present disclosure.

Prior to describing various examples of a probe delivery device, general characteristics of some embodiments of a probe delivery device will be described. A probe delivery device includes a distal end, which will be oriented towards vasculature of a patient during use, and a proximal end opposite the distal end. In some embodiments, the distal end may be configured to connect to an IV catheter device. In other embodiments, the distal end may include an IV catheter. In some embodiments, the proximal end of the probe delivery device may be configured to allow a separate device to be connected to the probe delivery device. For example, the proximal end may include an access port or a vacuum tube receiver that form part of a fluid pathway that extends to the distal end of the probe delivery device. In other embodiments, the distal end or another portion of the probe delivery device may be configured to allow a separate device to be connected to the probe delivery device. However, in some embodiments, the probe delivery device may not be configured to enable a separate device to be connected to the probe delivery device. For example, a probe delivery device may be configured to deliver a probe while not being configured for injecting fluid or withdrawing blood.

FIG. 1 illustrates an example of a probe delivery device 100 that is configured in accordance with some embodiments of the present disclosure. In some embodiments, the probe delivery device 100 may include a housing 105 having a distal end 100a and a proximal end 100b. In some embodiments, although only a portion of the distal end 100a is illustrated, as noted above, the distal end 100a could include any type of connector to enable the probe delivery device 100 to be connected to an IV catheter device or could incorporate an IV catheter. In some embodiments, the proximal end 100b may be configured to form a vacuum tube receiver 130 having a needle 131 covered by a protective sheath 132.

In some embodiments, a fluid pathway 110 may extend within the probe delivery device 100 from the needle 131 to the distal end 100a. Accordingly, when a vacuum tube 140 is inserted into the vacuum tube receiver 130, a blood sample can be collected through the fluid pathway 110. In some embodiments, the proximal end 100b may include a Luer connector or any other type of connector that is coupled to the fluid pathway 110.

In some embodiments, the probe delivery device 100 may include a probe delivery mechanism 150 that enables a probe 153 to be advanced in a distal direction through an IV catheter and subsequently withdrawn in a proximal direction. In some embodiments, the probe 153 may include a wire constructed of nickel titanium or another suitable material. In some embodiments, a compartment 120 may be formed within the probe delivery device 100 and may house the probe delivery mechanism 150. In some embodiments, a dividing wall 115 may create a probe channel 121 that extends distally from the compartment 120 and joins the fluid pathway 110 at a distal portion 110a of the fluid pathway 110.

In some embodiments, to isolate the compartment 120 from the fluid pathway 110, a seal 122 (e.g., an elastomeric septum) may be positioned within and span the probe channel 121. In some embodiments, the probe 153 may extend through a slit or other opening formed within seal 122. In some embodiments, the seal 122 may provide support to probe 153 to prevent it from buckling as it is advanced. Although probe channel 121 is illustrated as being substantially wider than probe 153, in some embodiments, dimensions of at least a portion of the probe channel 121 may be only slightly greater than the probe 153 so that probe channel 121 may provide support to prevent buckling of the probe 153.

In some embodiments, the probe delivery mechanism 150 may include a spool 155 and an advancement wheel 152, both of which may be configured to rotate within the compartment 120. In some embodiments, the spool 155 may be positioned adjacent to the advancement wheel 152 (i.e., towards the probe channel 121 relative to the advancement wheel 152). In some embodiments, the advancement wheel 152 may be positioned to extend partially out from the compartment 120 to thereby enable a clinician to use his or her thumb or finger to rotate the advancement wheel 152. In some embodiments, the spool 155 may include a gear 156 having teeth 156a. Likewise, in some embodiments, the advancement wheel 152 may include teeth 152a and may therefore function as a gear. In some embodiments, the teeth 152a may interface with the teeth 156a so that the spool 155 is rotated when the advancement wheel 152 is rotated. In some embodiments, the teeth 152a are formed along the outermost edge of the advancement wheel 152. In other embodiments, however, teeth 152a may be formed along a portion of advancement wheel that is inset relative to the outermost edge.

FIG. 1A provides an exploded rear view of probe delivery mechanism 150 in isolation, according to some embodiments. In some embodiments, the spool 155 and the advancement wheel 152 may include axles 155b and 152b, respectively, by which these components are positioned within the compartment 120 and around which these components rotate. In some embodiments, the spool 155 may include a spool drum 155a around which the probe 153 may be wound. Therefore, when the spool 155 is rotated, the rotation may cause probe 153 to be advanced or retracted along the probe channel 121 depending on the direction in which the advancement wheel 152 is rotated. In some embodiments, the gear formed by the advancement wheel 152 may have a larger diameter than the gear 156 to thereby cause probe 153 to be advanced or retracted a larger distance relative to the amount of rotation of advancement wheel 152. In contrast, in other embodiments, the gear formed by the advancement wheel 152 may have an equal or smaller diameter than the gear 156. In such embodiments, the probe 153 may advance or retract a smaller distance relative to the amount of rotation of the advancement wheel 152 but such advancement or retraction may be accomplished with a reduced amount of force to the advancement wheel 152.

In some embodiments, the probe delivery device 100 may include a seal (not illustrated) within the compartment 120 that isolates the spool drum 155a and the probe 153 from the external environment. In some embodiments, the seal 122 may or may not be employed since fluid entering the probe channel 121 would be prevented from escaping the compartment 120 by the seal within the compartment 120.

Figure 2:
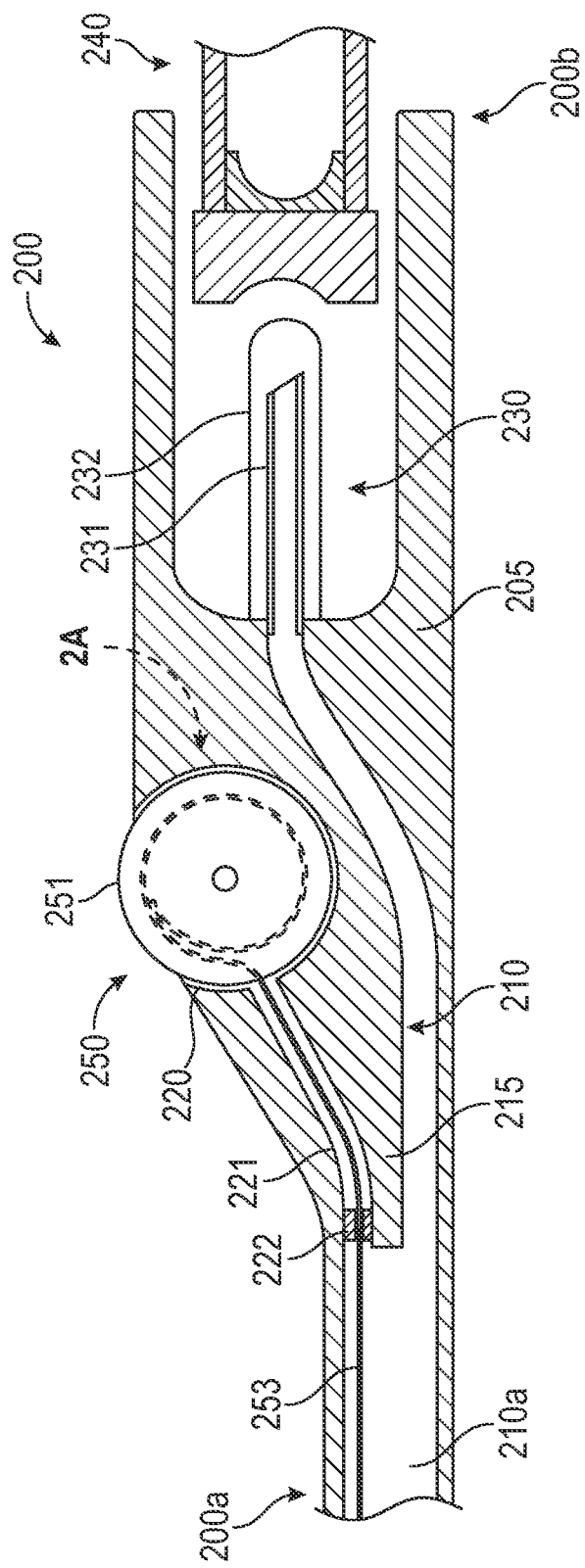
FIG. 2 is a cross-sectional side view of another probe delivery device, according to some embodiments.

FIG. 2 illustrates another example of a probe delivery device 200, in accordance with some embodiments. In some embodiments, the probe delivery device 200 may be similar or identical to the probe delivery device 100 in terms of one or more features and/or operation. In some embodiments, the probe delivery device 200 may include a housing 205 having a distal end 200a, which may be configured in any manner described above, and a proximal end 200b that forms a vacuum tube receiver 230 having a needle 231 covered by a protective sheath 232. In some embodiments, a fluid pathway 210 may extend within the probe delivery device 200 from the needle 231 to the distal end 200a. Accordingly, when a vacuum tube 240 is inserted into the vacuum tube receiver 230, a blood sample can be collected through the fluid pathway 210. In other embodiments, the proximal end 200b may include a Luer connector or any other type of connector that is coupled to the fluid pathway 210.

In some embodiments, the probe delivery device 200 may include a probe delivery mechanism 250 that enables a probe 253 to be advanced in a distal direction through an IV catheter and/or subsequently withdrawn in a proximal direction. In some embodiments, a compartment 220 may be formed within the probe delivery device 200 and may houses the probe delivery mechanism 250. In some embodiments, a dividing wall 215 may create a probe channel 221 that extends distally from the compartment 220 and joins the fluid pathway 210 at a distal portion 210a of the fluid pathway 210. In some embodiments, a seal 222 may be positioned within and the span probe channel 221 to isolate the probe channel 221 from the fluid pathway 210.

Figure 2A:
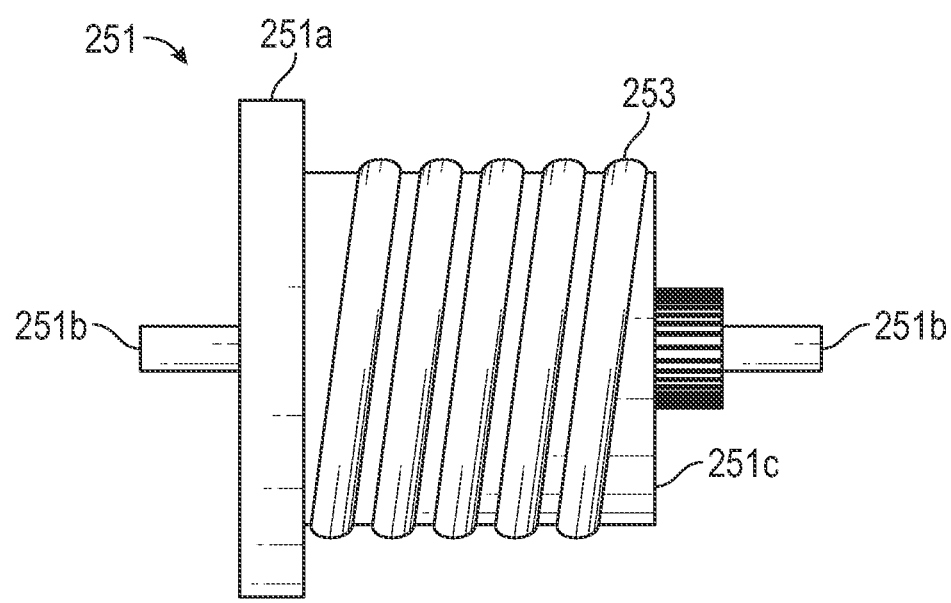
FIG. 2A is a rear view of a probe advancement mechanism of the probe delivery device of FIG. 2.

As illustrated in FIG. 2A, which is an isolated rear view of the probe delivery mechanism 250, the probe delivery mechanism 250 may include a spool 251 having an axle 251b that maintains spool 251 within compartment 220 and allows spool 251 to rotate. In some embodiments, the spool 251 may include a spool drum 251c around which the probe 253 is wound. In some embodiments, a portion of the spool 251 may form an advancement wheel 251a that extends upwardly from the compartment 220. Accordingly, a clinician can directly rotate the spool 251 by applying a force to the advancement wheel 251a. Such rotation can cause the probe 253 to be advanced and retracted within the probe channel 221 depending on the direction of rotation.

FIG. 3 illustrates another example of a probe delivery device 300, in accordance with some embodiments. In some embodiments, the probe delivery device 300 may be similar or identical to the probe delivery device 100 and/or the probe delivery device 200 in terms of one or more features and/or operation. In some embodiments, the probe delivery device 300 may include a housing 305 having a distal end 300a and a proximal end 300b. In some embodiments, the distal end 300a may form a connector 306 by which the probe delivery device 300 may be coupled to an IV catheter device (not illustrated). In some embodiments, the probe delivery device 300 is an example of a probe delivery device that is not configured to collect blood or inject fluid. Accordingly, in some embodiments, the proximal end 300b does not form a vacuum tube receiver or include an access port or other connector. In some embodiments, a probe channel, but not a fluid pathway, may be formed within the housing 305. In some embodiments, the probe 353 may be extended through the probe channel, out through the distal end 300a, into an IV catheter device to which the probe delivery device 300 is connected and ultimately through the IV catheter. It is noted, however, that in some embodiments, the proximal end 300b may be configured to allow blood to be collected or fluid to be injected using the probe delivery device 300 (e.g., using any of the techniques described in the present disclosure).

In some embodiments, the probe delivery device 300 may include a probe delivery mechanism 350 having a spool 351 that is generally similar to the spool 251. In particular, the spool 351 may include an axle 351b that maintains the spool 351 within the compartment 320 and allows the spool 351 to rotate. In some embodiments, the spool 351 may include a spool drum 351c around which the probe 353 is wound. In some embodiments, a portion of the spool 351 may form an advancement wheel 351a that extends upwardly from the compartment 320. Accordingly, a clinician can directly rotate the spool 351 by applying a force to the advancement wheel 351a and such rotation can cause the probe 353 to advance or retract.

FIG. 4 illustrates another example of a probe delivery device 400, in accordance with some embodiments. In some embodiments, the probe delivery device 400 may be similar or identical to one or more of the following in terms of one or more features and/or operation: the probe delivery device 100, the probe delivery device 200, and the probe delivery device 300. In some embodiments, the probe delivery device 400 may include a housing 405 having a distal end 400a, which may be configured in any manner described above, and a proximal end 400b from which tubing 430 having a connector 430a extends. In some embodiments, a fluid pathway 410 may extend within the probe delivery device 400 from the tubing 430 to a distal end 400a. Accordingly, a separate device could be coupled to the connector 430a to withdraw blood from or inject fluid into the fluid pathway 410. In some embodiments, the proximal end 400b may form a vacuum tube receiver similar to those described above. In some embodiments, the tube 430 may form a portion of the fluid pathway 410 (e.g., by extending distally up to the distal end of dividing wall 415).

In some embodiments, the probe delivery device 400 may include a probe delivery mechanism 450 that enables a probe 453 to be advanced in a distal direction through an IV catheter and subsequently withdrawn in a proximal direction. In some embodiments, a distal compartment 420a and a proximal compartment 420b are formed within the probe delivery device 400 and house the probe delivery mechanism 450. In some embodiments, a compartment channel 420c interconnects the distal compartment 420a and the proximal compartment 420b. In some embodiments, a dividing wall 415 may create a probe channel 421 that extends distally from the proximal compartment 420b and joins the fluid pathway 410 at a distal portion 410a of the fluid pathway 410. In some embodiments, a seal 422 may be positioned within and span the probe channel 421 to isolate the probe channel 421 from the fluid pathway 410.

In some embodiments, the probe delivery mechanism 450 may include a spool 451 having an axle 451b that maintains the spool 451 within distal compartment 420a and allows the spool 451 to rotate. In some embodiments, the spool 451 may include a spool drum 451c around which the probe 453 is wound. In some embodiments, a portion of the spool 451 may form an advancement wheel 451a that extends upwardly from the distal compartment 420a. Accordingly, a clinician can directly rotate spool 451 by applying a force to advancement wheel 451a.

In some embodiments, the probe delivery mechanism 450 may include a primary wheel 461 having an axle 461a that maintains the primary wheel 461 within the proximal compartment 420b and allows the primary wheel 461 to rotate. In some embodiments, the probe delivery mechanism 450 may further include one or more secondary wheels 462 that are adjacent to the primary wheel 461 and configured to rotate within proximal compartment 420b. In the depicted embodiment, there are four secondary wheels 462, but, in other embodiments, there may be a single secondary wheel or any other reasonable number of secondary wheels. Also, in some embodiments, probe delivery mechanism 450 may include primary wheel 461 and no secondary wheels.

In some embodiments, the probe 453 may be wound around the spool drum 451c and then extends proximally through the compartment channel 420c to wrap around the proximal side of the primary wheel 461. In some embodiments, each of the secondary wheels 462 can be positioned relative to the primary wheel 461 to retain the probe 453 in close proximity, or even in constant contact with the primary wheel 461. Accordingly, the arrangement of the primary wheel 461 and the secondary wheels 462 may facilitate the advancement of the probe 453 by reducing any resistance that may otherwise be caused as probe wraps around the primary wheel 461. In some embodiments, more particularly, the secondary wheels 462 can hold the probe 453 in contact with the primary wheel 461 so that, as the spool 451 is rotated to advance or retract the probe 453, the advancement or retraction may cause the primary wheel 461 to rotate in unison. In some embodiments, as illustrated in FIG. 4, the probe delivery mechanism 450 functions in a similar manner as a pulley system and can therefore reduce an amount of force that a clinician may need to apply to the spool 451 in order to advance or retract the probe 453.

FIG. 5 illustrates another example of a probe delivery device 500, in accordance with some embodiments. In some embodiments, the probe delivery device 500 may be similar or identical to one or more of the following in terms of one or more features and/or operation: the probe delivery device 100, the probe delivery device 200, the probe delivery device 300, and the probe delivery device 400. In some embodiments, the probe delivery device 500 may include a housing 505 having a distal end 500a, which may be configured in any manner described above, and a proximal end 500b from which tubing 530 having a connector 530a extends. In some embodiments, the tubing 530 may form the proximal portion of a fluid pathway 510 that extends within the probe delivery device 500 up to the distal portion 510a of the fluid pathway 510. In some embodiments, because the tubing 530 forms the proximal portion of the fluid pathway 510, there may be no need for a dividing wall to separate the proximal portion of the fluid pathway 510 from compartment 520. However, in other embodiments, a dividing wall could be formed within the housing 505 similar to the embodiments described above. In other embodiments, the connector 530a could be replaced with a vacuum tube receiver similar to embodiments described above. In some embodiments, a seal 522 may be positioned within the housing 505 to isolate the compartment 520 from a distal portion 510a of the fluid pathway 510.

In some embodiments, the probe delivery device 500 may include a probe delivery mechanism 550 that enables a probe 553 to be advanced in a distal direction through an IV catheter and subsequently withdrawn in a proximal direction. In some embodiments, the compartment 520 may be formed as a hollow interior of the housing 505. In some embodiments, the probe delivery mechanism 550 may include a first guide wheel 555 having a gear 556 with teeth 556a, an advancement wheel 552 having teeth 552a along its outermost edge such that advancement wheel 552 functions as a gear that drives gear 556. In some embodiments, the probe delivery mechanism 550 may further include a second guide wheel 561 that may be positioned below but adjacent to first guide wheel 555. In some embodiments, the probe 553 may include an end 553a that is fixed to a portion of the housing 505 (e.g., a portion adjacent to advancement wheel 552). In some embodiments, the probe 353 may be straight or curved or looped or configured in any way to facilitate easy advancement. In some embodiments, the probe 553 may be initially routed in a proximal direction within the compartment 520 and then in a distal direction to pass between the first guide wheel 555 and the second guide wheel 561 and through the seal 522.

In some embodiments, the first guide wheel 555 and the second guide wheel 561 can be positioned close together so that the probe 553 remains in contact with both guide wheels as probe 553 is advanced or retracted. For example, the second guide wheel 561 could be biased against the first guide wheel 555. Accordingly, when a clinician rotates the advancement wheel 552, the gear formed by the advancement wheel 552 may cause the first guide wheel 555 to rotate. In some embodiments, because the probe 553 is sandwiched between the first guide wheel 555 and the second guide wheel 561, the rotation of the first guide wheel 555 may cause the probe 553 to be advanced or retracted depending on the direction of rotation. In some embodiments, the second guide wheel 561 can be configured to rotate to reduce any resistance caused as probe 553 is advanced or retracted. In some embodiments, one or both of the first guide wheel 555 and the second guide wheel 561 can be formed of or coated with a high friction material so that the probe 553 will not slide relative to the wheels (i.e., the friction will ensure that the wheels rotate as the probe is advanced or retracted).

In some embodiments, including the depicted embodiment, the housing 505 may include a window 570 (e.g., a section of the housing that is transparent) that enables a clinician to see within the compartment 520. In some embodiments, the window 570 may enable the clinician to monitor the distance to which the probe 553 has been advanced. For example, a clinician may look through the window 570 to see where the curved portion of the probe 553 is positioned. In some embodiments, when this curved portion is positioned towards the proximal end 500b, the clinician can determine that the probe 553 is fully retracted. In contrast, when the curved portion is positioned towards the distal end of the compartment 520, the clinician can determine that the probe 553 is fully advanced. In some embodiments, the window 570 or another portion of the compartment 520 may include a ruler or other markings that represent the distance to which the probe 553 has been advanced when the curved portion of the probe 553 aligns with a particular marking. In some embodiments, the probe 553 may be colored to increase its visibility within the window 570. In some embodiments, coloring of the probe 553 may vary along its length such that the coloring can represent the distance to which the probe 553 has been advanced.

FIG. 6 illustrates another example of a probe delivery device 600, in accordance with some embodiments. In some embodiments, the probe delivery device 600 may be similar or identical to one or more of the following in terms of one or more features and/or operation: the probe delivery device 100, the probe delivery device 200, the probe delivery device 300, the probe delivery device 400, and the probe delivery device 500. In some embodiments, the probe delivery device 600 may include a housing 605 having a distal end 600a, which may be configured in any manner described above, and a proximal end 600b from which tubing 630 having a connector 630a extends. In some embodiments, a fluid pathway 610 may extend within the probe delivery device 600 from tubing 630 to the distal end 600a.

In some embodiments, the probe delivery device 600 may include a probe delivery mechanism 650 that enables a probe 653 to be advanced in a distal direction through an IV catheter and subsequently withdrawn in a proximal direction. In some embodiments, a compartment 620/620a/620b is formed within probe delivery device 600 and houses the probe delivery mechanism 650. In some embodiments, a dividing wall 615 may create a probe channel 621 that extends distally from compartment 620 and joins fluid pathway 610 at a distal portion 610a of fluid pathway 610. In some embodiments, a seal 622 may be positioned within and span the probe channel 621 to isolate the probe channel 621 from the fluid pathway 610.

In some embodiments, the probe delivery mechanism 650 may include a pinion 655 that is configured to rotate within the compartment 620. In some embodiments, the probe delivery mechanism 650 may also include a rack mechanism 652 having a rack 652b and an actuator portion 652a. In some embodiments, the actuator portion 652a may extend out from proximal portion 620b of the compartment 620 to thereby enable a clinician to use his or her thumb or finger to slide the rack mechanism 652 along the proximal portion 620b and distal portion 620a of compartment 620. In some embodiments, the rack 652b may be positioned to interface with the pinion 655 so that the pinion 655 rotates as the rack 652b is slid laterally. In some embodiments, the pinion 655 may include a spool drum (not visible) around which the probe 653 may be wound. This spool drum of the pinion 655 can be similar to those described above. Accordingly, as the rack mechanism 652 is slid distally, the probe 653 may be advanced distally. Likewise, as the rack mechanism 652 is slid proximally, the probe 653 may be withdrawn proximally. In some embodiments, the position of actuator portion 652a can therefore represent the distance to which the probe 653 is advanced. In some embodiments, a ruler or other markings may be formed on a portion of housing 605 along which actuator portion 652a slides.

Figure 7:
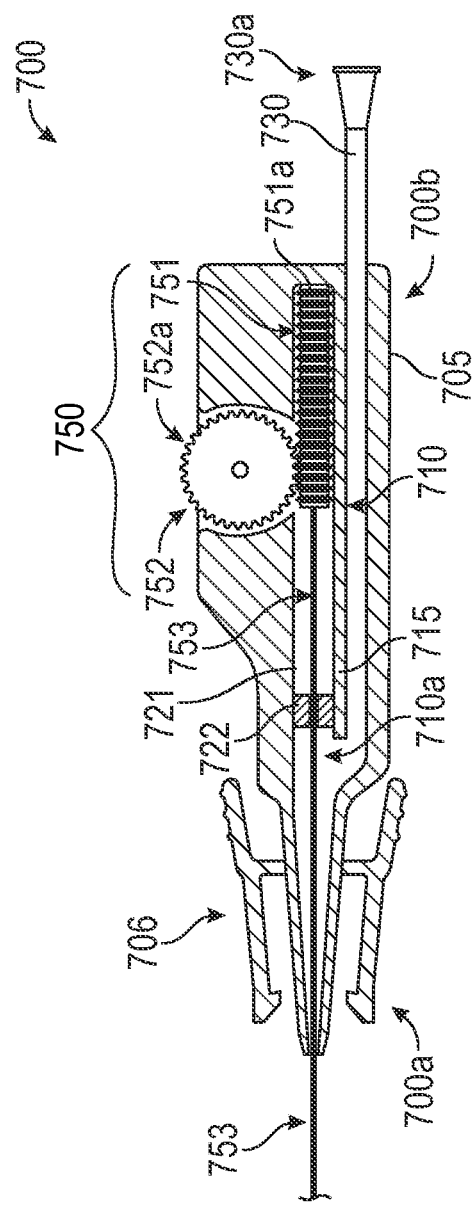
FIG. 7 is a cross-sectional side view of another probe delivery device, according to some embodiments.

FIG. 7 illustrates another example of a probe delivery device 700, in accordance with some embodiments. In some embodiments, the probe delivery device 700 may be similar or identical to one or more of the following in terms of one or more features and/or operation: the probe delivery device 100, the probe delivery device 200, the probe delivery device 300, the probe delivery device 400, the probe delivery device 500, and the probe delivery device 600. In some embodiments, the probe delivery device 700 may include a housing 705 having a distal end 700a forming a connector 706 and a proximal end 700b from which tubing 730 having a connector 730a extends. In some embodiments, a fluid pathway 710 may extend within the probe delivery device 700 from tubing 730 to distal end 700a.

In some embodiments, the probe delivery device 700 may include a probe delivery mechanism 750 that enables a probe 753 to be advanced in a distal direction through an IV catheter and subsequently withdrawn in a proximal direction. In some embodiments, a compartment 720 is formed within the probe delivery device 700 and houses the probe delivery mechanism 750. In some embodiments, a dividing wall 715 creates a probe channel 721 that extends distally from the compartment 720 and joins the fluid pathway 710 at a distal portion 710*a* of the fluid pathway 710. In some embodiments, a seal 722 may be positioned within and span the probe channel 721 to isolate the probe channel 721 from the fluid pathway 710.

In some embodiments, the probe delivery mechanism 750 may include a shaft 751 that is positioned at a proximal end of probe channel 721 and an advancement wheel 752 that is positioned within compartment 720 and extends out from housing 705. In some embodiments, the advancement wheel 752 may include teeth 752*a* that interface with teeth 751*a* of the shaft 751. Accordingly, when a clinician rotates the advancement wheel 752, the shaft 751 will be moved linearly within the probe channel 721. In some embodiments, the probe 753 can be secured within the shaft 751 so that, when the shaft 751 is moved linearly, the probe 753 will advance distally or withdraw proximally depending on the direction of rotation of the advancement wheel 752.

FIG. 8 illustrates another example of a probe delivery device 800, in accordance with some embodiments. In some embodiments, the probe delivery device 800 may be similar or identical to one or more of the following in terms of one or more features and/or operation: the probe delivery device 100, the probe delivery device 200, the probe delivery device 300, the probe delivery device 400, the probe delivery device 500, the probe delivery device 600, and the probe delivery device 700. In some embodiments, the probe delivery device 800 may include a housing 805 having a distal end 800*a*, which may be configured in any manner described above, and a proximal end 800*b* that forms a vacuum tube receiver 830 having a needle 831 covered by a protective sheath 832. In some embodiments, a fluid pathway 810 may extend within the probe delivery device 800 from needle 831 to distal end 800*a*.

In some embodiments, the probe delivery device 800 may include a probe delivery mechanism 850 that enables a probe 853 to be advanced in a distal direction through an IV catheter and subsequently withdrawn in a proximal direction. In some embodiments, a compartment 820 is formed within the probe delivery device 800 and houses the probe delivery mechanism 850. In some embodiments, a dividing wall 815 may create a probe channel 821 that extends distally from compartment 820 and joins the fluid pathway 810 at a distal portion 810*a* of the fluid pathway 810. In some embodiments, a seal 822 may be positioned within and span the probe channel 821 to isolate the probe channel 821 from the fluid pathway 810.

In some embodiments, the probe delivery mechanism 850 may include a sliding member 851 having an actuator portion 851*a* that extends out from the compartment 820 and a wheel 851*b* that is connected to the actuator portion 851*a*. In some embodiments, the compartment 820 can be configured to allow the sliding member 851 to slide distally and proximally within the compartment 820 when a clinician applies a force to the actuator portion 851*a*. In some embodiments, an end 853*a* of the probe 853 can be fixed to the housing 805 towards a distal end of compartment 820. In some embodiments, the probe 853 is initially routed in a proximal direction around wheel 851*b* and then in a distal direction through probe channel 821. In some embodiments, the wheel 851*b* can be configured to retain the probe 853 in contact with the wheel 851*b* even while the sliding member 851 is slid within the compartment 820 (e.g., using retaining bars (not illustrated) that perform a similar function as the secondary wheels 462). Accordingly, as the sliding member 851 is slid distally, wheel 851*b* can rotate to thereby advance the probe 853 in a distal direction. In some embodiments, because the probe 853 is "folded back" on itself, the probe 853 will be advanced/retracted twice the distance that sliding member 851 is advanced/retracted.

A number of variations have been described in the context of particular depicted embodiments. It is noted that, even though not explicitly described for each depicted embodiment, such variations may apply to any of the above-described or depicted embodiments. A number of additional variations may also be made as is now described.

In some embodiments, a probe delivery mechanism may include a spring or other mechanism that becomes loaded as the probe is advanced. In such embodiments, the probe delivery mechanism may also include a ratcheting or locking mechanism that prevents the spring from unloading until the clinician releases the ratcheting or locking mechanism (e.g., by pressing a button). Once released, the spring can cause the probe to automatically retract. For example, in the context of FIG. 2, a spring and ratcheting mechanism may be incorporated into the spool 251, and a release button may be integrated into the housing 205. In such cases, as the spool 251 is rotated to advance the probe 253, the spring will become loaded. Once the clinician desires to withdraw the probe 253, he or she may press the button to release the ratcheting mechanism. The loaded spring will then cause the spool 251 to rotate in the reverse direction to cause the probe 253 to be wound back around the spool drum 251*c*. Similar techniques could be employed on any of the embodiments that employ a wheel, spool or other rotating member. With regards to the probe delivery mechanism 650 and the probe delivery mechanism 850, a linear spring could be loaded as the respective actuator portion is slid distally and unloaded in response to the clinician releasing a ratcheting or other locking mechanism.

In any of described embodiments, the probe delivery device may include some type of indicia representing how far the probe is advanced. Such indicia could be passive (e.g., ruler markings, labels, colors, scales, numbers, symbols, etc.) or active (e.g., a digital display, a speaker, etc.). Also, in any of the described embodiments, the probe delivery mechanism may include mechanisms for preventing over-advancement or over-retraction of the probe. For example, the embodiments that employ rotating components could include stops that contact the rotating components when the probe has reached its maximum advancement distance. As suggested above, although the depicted embodiments show the fluid pathway extending to the proximal end of the probe delivery device, in some embodiments, the fluid pathway could extend out from the probe delivery device at a point other than the proximal end including towards a distal end of the probe delivery device. As an example only, the fluid pathway 110 could extend out of the probe delivery device 100 towards the distal portion 110*a* at a point opposite the probe delivery mechanism 150 to form a vacuum tube receiver or other connector.

In any of the described embodiments, the fluid pathway and the probe channel may be the same pathway/channel. For example, FIG. 9 illustrates a probe delivery device 900 that resembles the probe delivery device 100 except that the probe delivery device 900 does not include the fluid pathway 110 or the seal 122. Instead, the probe channel 121 forms the distal portion of the fluid pathway. In some embodiments, a proximal portion 910 of the fluid pathway can extend from the spool 155 to the needle 131 (or any other connector/adapter that may be employed). In such embodiments, the probe 153 may be in the form of a tube such that the probe 153 forms the proximal portion 910 of the fluid pathway. In other words, the proximal end of the probe 153 may extend proximally (or in some other direction) from the spool 155 to connect to the needle 131. In other variations, separate tubing may extend from the probe channel or the compartment that houses the probe delivery mechanism to form the proximal end of the fluid pathway. For example, a separate tube or channel could be formed from compartment 520, 620 or 820 to form a fluid pathway to a vacuum tube receiver or other connector.

Figure 10B:
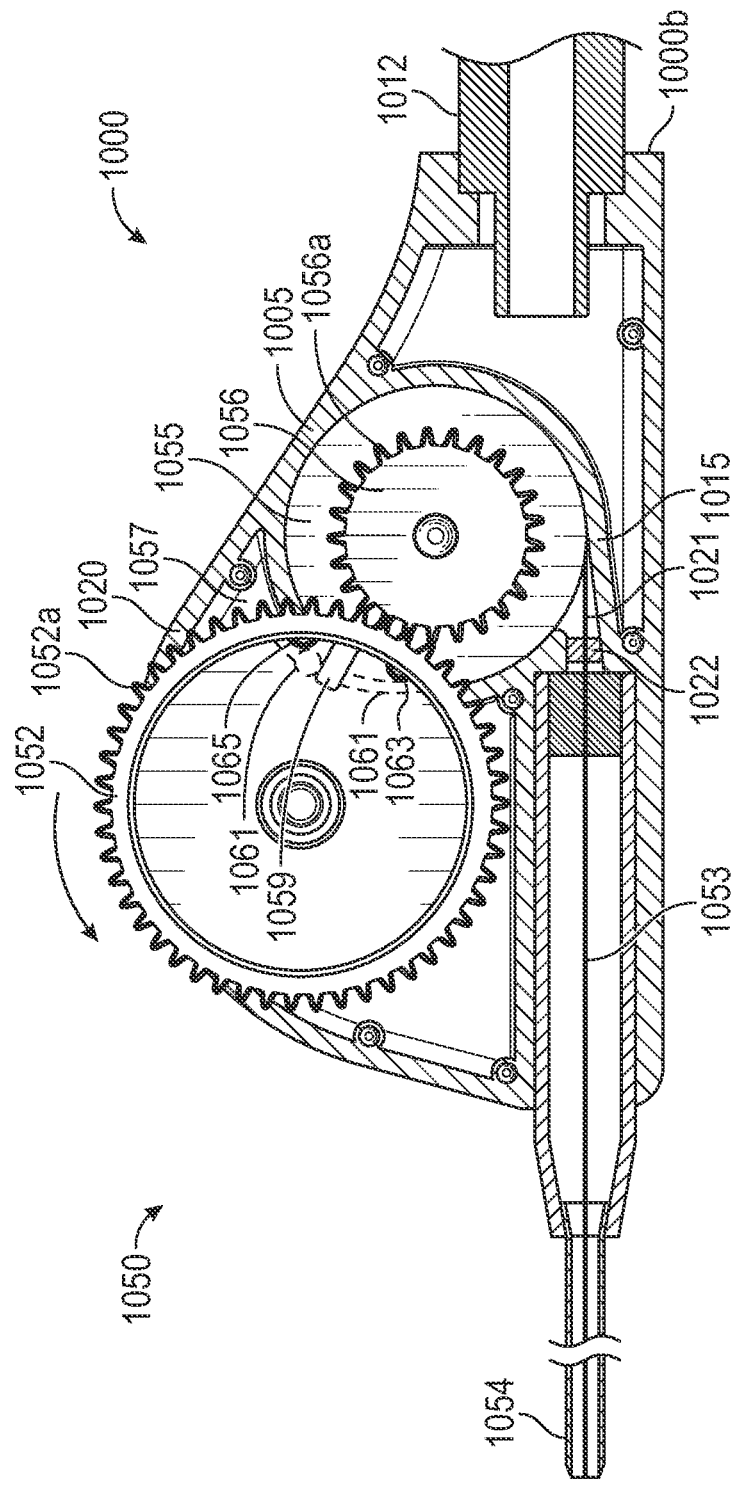
FIG. 10B is a cross-sectional side view of the probe delivery device of FIG. 10A, illustrating the probe delivery device in a second configuration, according to some embodiments.
Figure 10C:
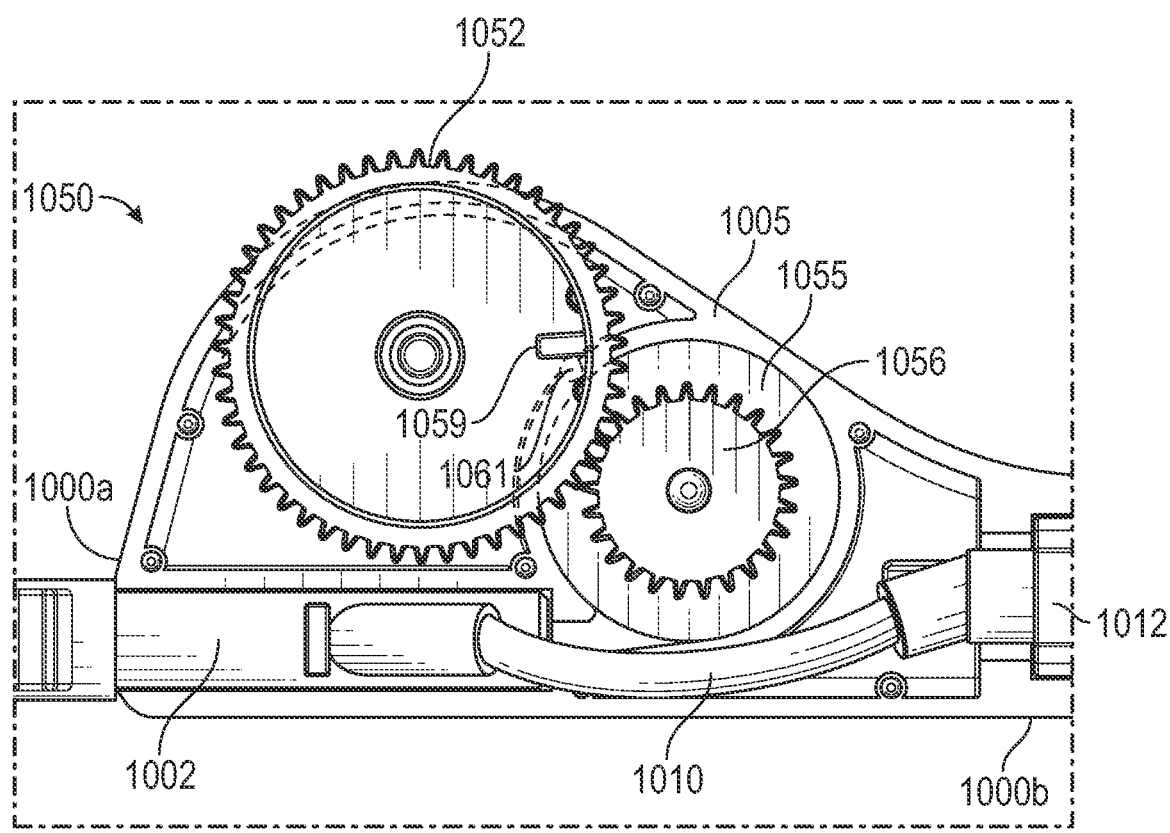
FIG. 10C is an upper perspective view of the probe delivery device of FIG. 10A, illustrating the probe delivery device in the first configuration, according to some embodiments.

FIGS. 10A-10C illustrate another example of a probe delivery device 1000, in accordance with some embodiments. In some embodiments, the probe delivery device 1000 may be similar or identical to one or more of the following in terms of one or more features and/or operation: the probe delivery device 100, the probe delivery device 200, the probe delivery device 300, the probe delivery device 400, the probe delivery device 500, the probe delivery device 600, the probe delivery device 700, the probe delivery device 800, and the probe delivery device 900.

In some embodiments, the probe delivery device 1000 may include a housing 1005, which may include a distal end 1000a and a proximal end 1000b. In some embodiments, the distal end 1000a may include any type of connector to enable the probe delivery device 1000 to be connected to an IV catheter device 1002 or could incorporate an IV catheter. In some embodiments, the proximal end 1000b may be configured to form a vacuum tube receiver, which may include a needle covered by a protective sheath (see, for example, FIG. 1). In some embodiments, as illustrated in FIG. 10B, the proximal end 1000b may include a Luer connector or another suitable type of connector that couples to a blood collection device 1012.

In some embodiments, a fluid pathway 1010 may extend within the probe delivery device 1000 through the distal end 1000a and the proximal end 1000b of the housing 1005. Accordingly, when the blood collection device 1012 is coupled to the proximal end 1000b, a blood sample can be collected through the fluid pathway 1010. In some embodiments, the fluid pathway 1010 may be configured to connect a side port of the IV catheter device 1002 with the blood collection device 1012 and may be disposed laterally to the cross-section of FIGS. 10A-10B. In some embodiments, the fluid pathway 1010 may extend through a tube coupled to and/or integrated with the side port of the IV catheter device 1002 and the blood collection device 1012, as illustrated, for example, in FIG. 10C. In FIG. 10C, the housing 1005 is transparent, according to some embodiments, which allows illustration of internal components of the housing 1005.

In some embodiments, the probe delivery device 1000 may include a probe delivery mechanism 1050 that enables a probe 1053 to be advanced in a distal direction through an IV catheter 1054 and/or subsequently withdrawn in a proximal direction. In some embodiments, the probe 1053 may include a wire constructed of nickel titanium or another suitable material. In some embodiments, a compartment 1020 may be formed within the probe delivery device 1000 and may house the probe delivery mechanism 1050. In some embodiments, a dividing wall 1015 may create a probe channel 1021 that extends distally from the compartment 1020 and joins the fluid pathway 1010 at a distal portion 1010a of the fluid pathway 1010.

In some embodiments, to isolate the compartment 1020 from the fluid pathway 1010, a seal 1022 (e.g., an elastomeric septum) may be positioned within and span the probe channel 1021. In some embodiments, the probe 1053 may extend through a slit or other opening formed within seal 1022. In some embodiments, the seal 1022 may provide support to probe 1053 to prevent it from buckling as it is advanced.

In some embodiments, the probe delivery mechanism 1050 may include a spool 1055 and an advancement wheel 1052, both of which may be configured to rotate within the compartment 1020. In some embodiments, the spool 1055 may be positioned adjacent to the advancement wheel 1052 (e.g., towards the probe channel 1021 relative to the advancement wheel 1052). In some embodiments, the advancement wheel 1052 may be positioned to extend partially out from the compartment 1020 to thereby enable a clinician to use his or her thumb or finger to rotate the advancement wheel 1052. In some embodiments, the spool 1055 may include a gear 1056 having teeth 1056a. Likewise, in some embodiments, the advancement wheel 1052 may include teeth 1052a and may therefore function as a gear. In some embodiments, the teeth 1052a may interface with the teeth 1056a so that the spool 1055 is rotated when the advancement wheel 152 is rotated. In some embodiments, the teeth 1052a may be formed along the outermost edge of the advancement wheel 1052. In other embodiments, however, teeth 1052a may be formed along a portion of advancement wheel that is inset relative to the outermost edge.

Figure 10D:
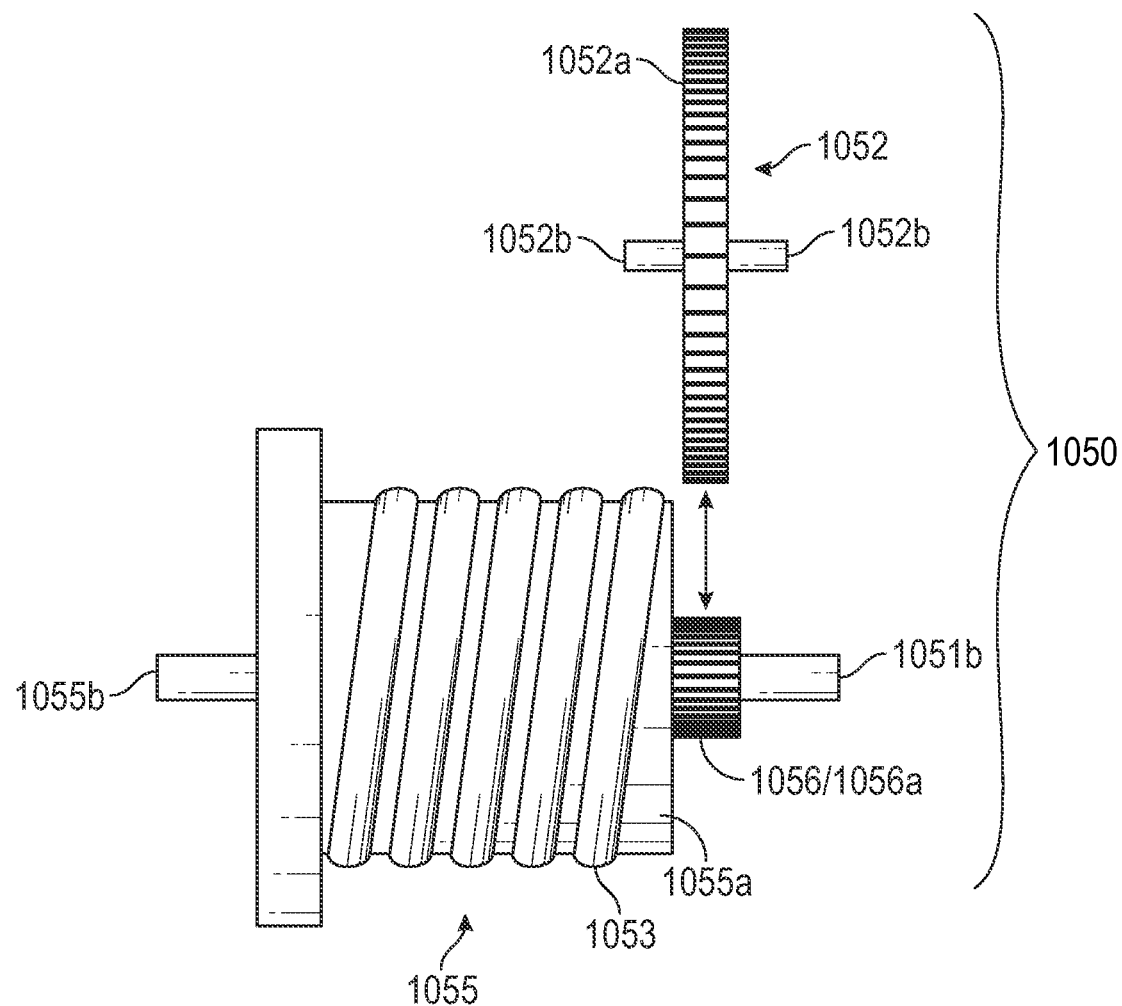
FIG. 10D is an exploded rear view of an example probe advancement mechanism of the probe delivery device of FIG. 10A, according to some embodiments.

FIG. 10D provides an exploded rear view of the probe delivery mechanism 1050 in isolation, according to some embodiments. In some embodiments, the spool 1055 and the advancement wheel 152 may include axles 1055b and 1052b, respectively, by which these components are positioned within the compartment 1020 and around which these components rotate. In some embodiments, the spool 1055 may include a spool drum 1055a around which the probe 1053 may be wound. Therefore, when the spool 1055 is rotated, the rotation may cause probe 1053 to be advanced or retracted along the probe channel 1021 depending on the direction in which the advancement wheel 1052 is rotated. In some embodiments, the gear formed by the advancement wheel 1052 may have a larger diameter than the gear 1056 to thereby cause probe 1053 to be advanced or retracted a larger distance relative to the amount of rotation of advancement wheel 1052. In contrast, in other embodiments, the gear formed by the advancement wheel 1052 may have an equal or smaller diameter than the gear 1056. In such embodiments, the probe 1053 may advance or retract a smaller distance relative to the amount of rotation of the advancement wheel 1052 but such advancement or retraction may be accomplished with a reduced amount of force to the advancement wheel 1052.

In some embodiments, the probe delivery device 1000 may include a seal (not illustrated) within the compartment 1020 that isolates the spool drum 1055a and the probe 1053 from the external environment. In some embodiments, the seal 1022 may or may not be employed since fluid entering the probe channel 1021 may be prevented from escaping the compartment 1020 by the seal within the compartment 1020.

In some embodiments, the probe delivery device 1000 may facilitate needle-free delivery of a probe 1219 into vasculature of the patient for blood collection, fluid delivery, patient or device monitoring, or other clinical needs by utilizing an existing vascular access device dwelling within the vasculature of the patient, such as the IV catheter device 1002. In some embodiments, the probe delivery device 1000 may reduce trauma to the vein, decrease fill time, and overcome thrombus and fibrin sheath in or around the vascular access device that may otherwise prevent blood draw.

In some embodiments, the spool 1055 may be turned or allowed to turn to advance the probe 1053 in a distal direction. In some embodiments, it is important that there is a means to stop the spool 1055 and/or the advancement wheel 1052. In further detail, in some embodiments, the advancement wheel 1052 may include a stop member 1059 and the housing 1005 may include another stop member 1061. In some embodiments, the stop member 1059 may be disposed on an outer surface of the advancement wheel 1052 and/or the other stop member 1061 may be disposed on an inner surface 1057 of the housing 1005. In some embodiments, the stop member 1059 and/or the other stop member 1061 may include a protrusion or another element configured to contact or interfere with each other and stop further rotation of the advancement wheel 1052. In some embodiments, the stop member 1059 and the other stop member 1061 may be configured to contact each other to stop rotation of the advancement wheel 1052 and the spool 1055.

FIG. 10A illustrates the advancement wheel 1052 and the probe 1053 in a first configuration, according to some embodiments. FIG. 10B illustrates the advancement wheel 1052 and the probe 1053 in a second configuration, in which the probe 1053 is advanced, according to some embodiments. In some embodiments, the advancement wheel 1052 may be rotated between the first configuration and the second configuration but may be prevented from completing a full turn by contact between the stop member 1059 and the other stop member 1061, which may stop rotation of the advancement wheel 1052. In some embodiments, the advancement wheel 1052 may be rotated in an opposite direction from the second configuration to the first configuration to retract the probe 1053 after use. In some embodiments, the advancement wheel 1052 may be prevented from rotating more than 360 degrees because of contact between the stop member 1059 and the other stop member 1061.

In some embodiments, the advancement wheel may be rotated in a first direction from the first configuration to the second configuration. In some embodiments, in the first configuration, the stop member 1059 and the other stop member 1061 may contact each other to stop rotation of the advancement wheel 1052 in a second direction opposite the first direction. In some embodiments, in the second configuration, the stop member 1059 and the other stop member 1061 may be configured to contact each other to prevent further rotation of the advancement wheel 1052 in the first direction, thereby stopping advancement of the probe 1053 in the distal direction.

In some embodiments, the outer surface of the advancement wheel 1052 may include a bump 1063 and/or another bump 1065 that may be spaced apart from the stop member 1059. In some embodiments, a width of the other stop member 1061 may be approximately equal to or slightly less than a space between the bump 1063 and the stop member 1059 and/or a space between the other bump 1065 and the stop member 1059. Thus, in some embodiments, the other stop member 1061 may fit snugly between the bump 1063 and the stop member 1059 and/or between the other bump 1065 and the stop member 1059. In some embodiments, the bump 1063 and/or the other bump 1065 may provide some securement of the probe 1053 in the advanced position and/or the retracted position.

In some embodiments, the bump 1063 may provide resistance to movement and turning of the advancement wheel 1052 when the advancement wheel 1052 is in the first configuration. In some embodiments, the other bump 1065 may provide resistance to movement and turning of the advancement wheel 1052 when the advancement wheel 1052 is in the second configuration. In some embodiments, the bump 1063 and/or the other bump 1065 may each have a width and/or a height less than that of the stop member 1059 such that the resistance to movement and turning of the advancement wheel 1052 provided by the bump 1063 and/or the other bump 1065 can be overcome, for example, to turn the advancement wheel 1052 from the first configuration to the second configuration and from the second configuration to the first configuration. In some embodiments, the stop member 1059 may extend inwardly further than the other stop member 1061 to facilitate blocking passage of the other stop member 1061, It is understood that in some embodiments, the bump 1063 and/or the other bump 1065 may be disposed on the inner surface of the housing 1005 to perform a same or similar function. In these embodiments, the bump 1063 and/or the other bump 1065 may be spaced apart from the other stop member 1061, and a width of the stop member 1059 may be approximately equal to or slightly less than a space between the bump 1063 and the other stop member 1061 and/or a space between the other bump 1065 and the other stop member 1061. It is also understood that the bump 1063, the other bump 1065, or an additional bump or bumps may be placed at alternate locations on the outer surface of the advancement wheel 1052 and/or the inner surface of the housing 1005. In these embodiments, one or more of the bump 1063, the other bump 1065, and the additional bump or bumps may signal to the clinician that the advancement wheel 1052 and therefore the spool 1055 and the probe 1053 are in a particular position.

FIGS. 11A-11E illustrate another example of a probe delivery device 1100, in accordance with some embodiments. In some embodiments, the probe delivery device 1100 may be similar or identical to one or more of the following in terms of one or more features and/or operation: the probe delivery device 100, the probe delivery device 200, the probe delivery device 300, the probe delivery device 400, the probe delivery device 500, the probe delivery device 600, the probe delivery device 700, the probe delivery device 800, the probe delivery device 900, and the probe delivery device 1000. In some embodiments, the probe delivery device 1100 may be moved from FIG. 11A to FIG. 11B to FIG. 11C to FIG. 11D to FIG. 11E.

In some embodiments, the probe delivery device 1100 may include a first wheel 1102 and a second wheel 1104. In some embodiments, the first wheel 1102 of the probe delivery device 1100 may include or correspond to the advancement wheel 152 of FIG. 1, the spool 155 of FIG. 1, the spool 251 of FIG. 2, the spool 351 of FIG. 3, the spool 451 of FIG. 4, the advancement wheel 552 of FIG. 5, the first guide wheel 555 of FIG. 5, the pinion 655 of FIG. 6, the advancement wheel 752 of FIG. 7, or the advancement wheel 1052 of FIG. 10.

In some embodiments, the probe delivery device 1100 may include a housing 1105, which may include a distal end and a proximal end. In some embodiments, the distal end of the housing 1105 may be configured to couple to an IV catheter device. In some embodiments, the housing 1105 of the probe delivery device 1100 may include or correspond to the housing 105 of FIG. 1, the housing 205 of FIG. 2, the housing 305 of FIG. 3, the housing 405 of FIG. 4, the housing 505 of FIG. 5, the housing 605 of FIG. 6, the housing 705 of FIG. 7, the housing 805 of FIG. 8, or the housing 1005 of FIG. 10.

In some embodiments, an inner surface 1107 of the housing 1105 may include a housing stop member 1109, which may include a protrusion. In some embodiments, the housing stop member 1109 may include a first side 1109*a* and a second side 1109*b*, which may be opposite the first side 1109*a*.

In some embodiments, the first wheel 1102 may rotate on an axle 1111. In some embodiments, the first wheel 1102 may include a protrusion or rod 1110, which may rotate on the axle 1111. In some embodiments, the axle 1111 may be aligned with a center axis of the first wheel 1102. In some embodiments, the second wheel 1104 may be disposed on the rod 1110 and configured to slip with respect to the rod 1110 and/or rotate independently from the rod 1110. In some embodiments, the second wheel 1104 may ride directly on the axle 1111, along with the first wheel 1102. In some embodiments, the axle 1111 may extend inwardly from the housing 1105. In some embodiments, the first wheel 1102 and the second wheel 1104 may rotate about a same axis and/or the second wheel 1104 may be disposed within the first wheel 1102.

In some embodiments, an inner surface 1113 of the first wheel 1102 may include a first wheel stop member 1115, which may include a protrusion. In some embodiments, a gap may be disposed between the housing stop member 1109 and the first wheel stop member 1115. In some embodiments, the second wheel 1104 may include a tab 1117, which may be configured to bridge the gap between the housing stop member 1109 and the first wheel stop member 1115.

In some embodiments, the probe delivery device 1100 may include a probe. In some embodiments, the housing probe of the probe delivery device 1100 may include or correspond to the probe 153 of FIG. 1, the probe 253 of FIG. 2, the probe 353 of FIG. 3, the probe 453 of FIG. 4, the probe 553 of FIG. 5, the probe 653 of FIG. 6, the probe 753 of FIG. 7, the probe 853 of FIG. 8, or the probe 1053 of FIG. 10.

In some embodiments, the first wheel 1102 may be configured to rotate to advance the probe in a distal direction through the distal end of the housing 1105. In some embodiments, the first wheel 1102 may be configured to rotate more than one full turn. In some embodiments, the probe delivery device 1100 may be disposed in a first configuration, as illustrated, for example, in FIG. 11A.

In some embodiments, in response to the probe delivery device 1100 being disposed in the first configuration, the tab 1117 may be disposed between the housing stop member 1109 and the first wheel stop member 1115 and may contact the housing stop member 1109 and the first wheel stop member 1115. In these embodiments, a first side 1117*a* of the tab 1117 may contact a first side 1109*a* of the housing stop member 1109 and a second side 1117*b* of the tab 1117 may contact a first side 1115*a* of the first wheel stop member 1115. In some embodiments, in response to the probe delivery device 1100 being disposed in the first configuration, the first wheel 1102 and/or the second wheel 1104 may be prevented from rotating in a first direction 1121, toward the housing stop member 1109, but may be configured to rotate in a second direction 1123 opposite the first direction 1121. In some embodiments, the first wheel 1102 may be configured to rotate more than one full turn in the second direction.

In some embodiments, in response to the probe delivery device 1100 being disposed in the first configuration, the first wheel 1102 may be configured to rotate independent from the housing 1105 and the second wheel 1104 in a second direction 1123 until the first wheel stop member 1115 contacts the tab 1117. In these embodiments, the first wheel 1102 may be configured to rotate independent from the housing 1105 and the second wheel 1104 in the second direction 1123 opposite the first direction 1121 until a second side 1115*b* of the first wheel stop member 1115 contacts the first side 1117*a* of the tab 1117, which may be disposed on an opposite side of the tab 1117 as the second side 1117*b*. In these embodiments, the first wheel 1102 may be configured to rotate almost one full turn independent from the housing 1105 and the second wheel 1104.

In some embodiments, the probe may be in a retracted or fully retracted position in response to the probe delivery device 1100 being in the first configuration. In some embodiments, in response to the first wheel 1102 rotating independent from the housing 1105 and the second wheel 1104 in the second direction 1123 until the first wheel stop member 1115 contacts the second side 1117*b* of the tab 1117, the first wheel 1102 and the second wheel 1104 are configured to rotate together further in the second direction 1123 until the probe delivery device 1100 is disposed in a second configuration. In these embodiments, the first wheel 1102 and the second wheel 1104 may be configured to rotate together almost one full turn.

In some embodiments, the probe may be in an advanced or fully advanced position in response to the probe delivery device 1100 being in the second configuration. In some embodiments, in the second configuration, the tab 1117 may be disposed between the housing stop member 1109 and the first wheel stop member 1115 and may contact the housing stop member 1109 and the first wheel stop member 1115. In these embodiments, the second side 1117*b* of the tab 1117 may contact the second side 1109*b* of the housing stop member 1109 and the first side 1117*a* of the tab 1117 may contact the second side 1115*b* of the first wheel stop member 1115, as illustrated, for example, in FIG. 11E.

Figure 11A:
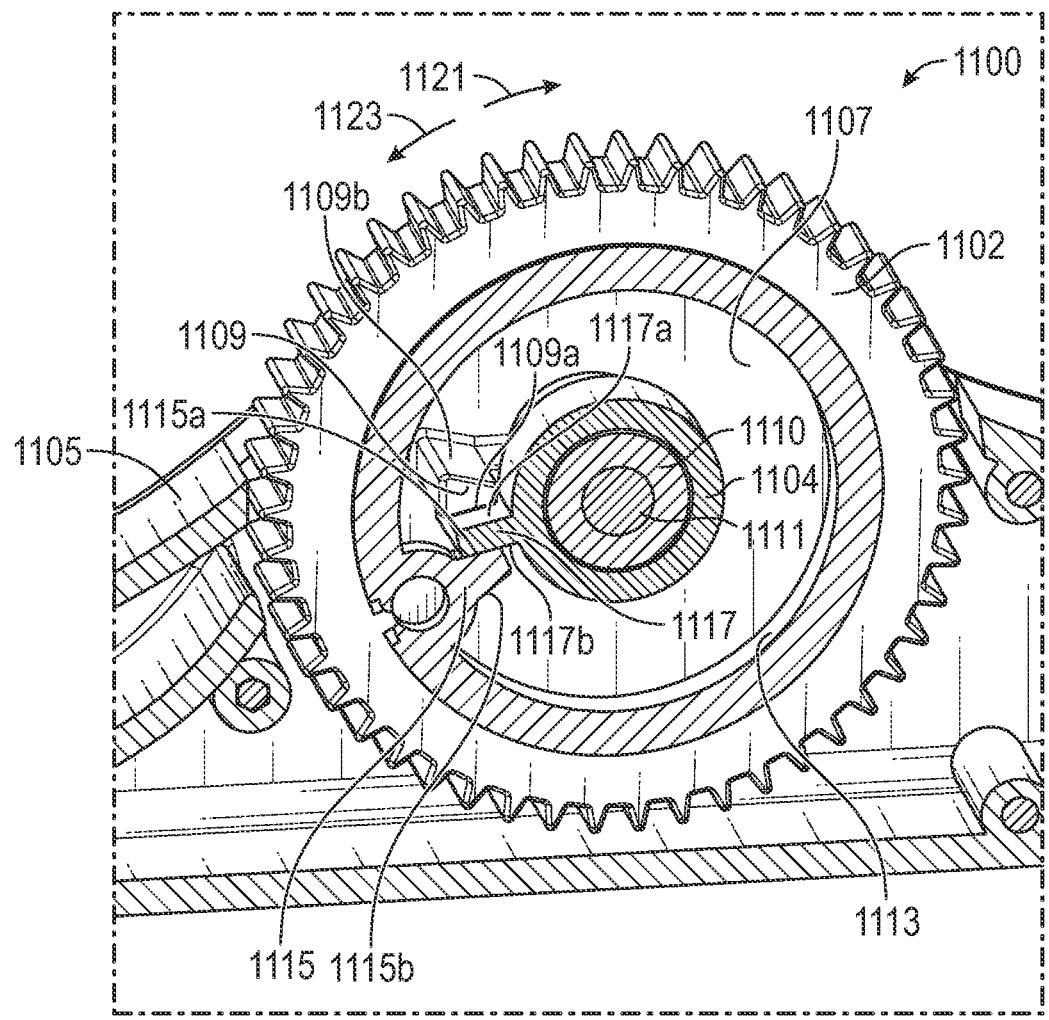
FIG. 11A is a cross-sectional side view of another probe delivery device, illustrating the probe delivery device in a first configuration, according to some embodiments.
Figure 11B:
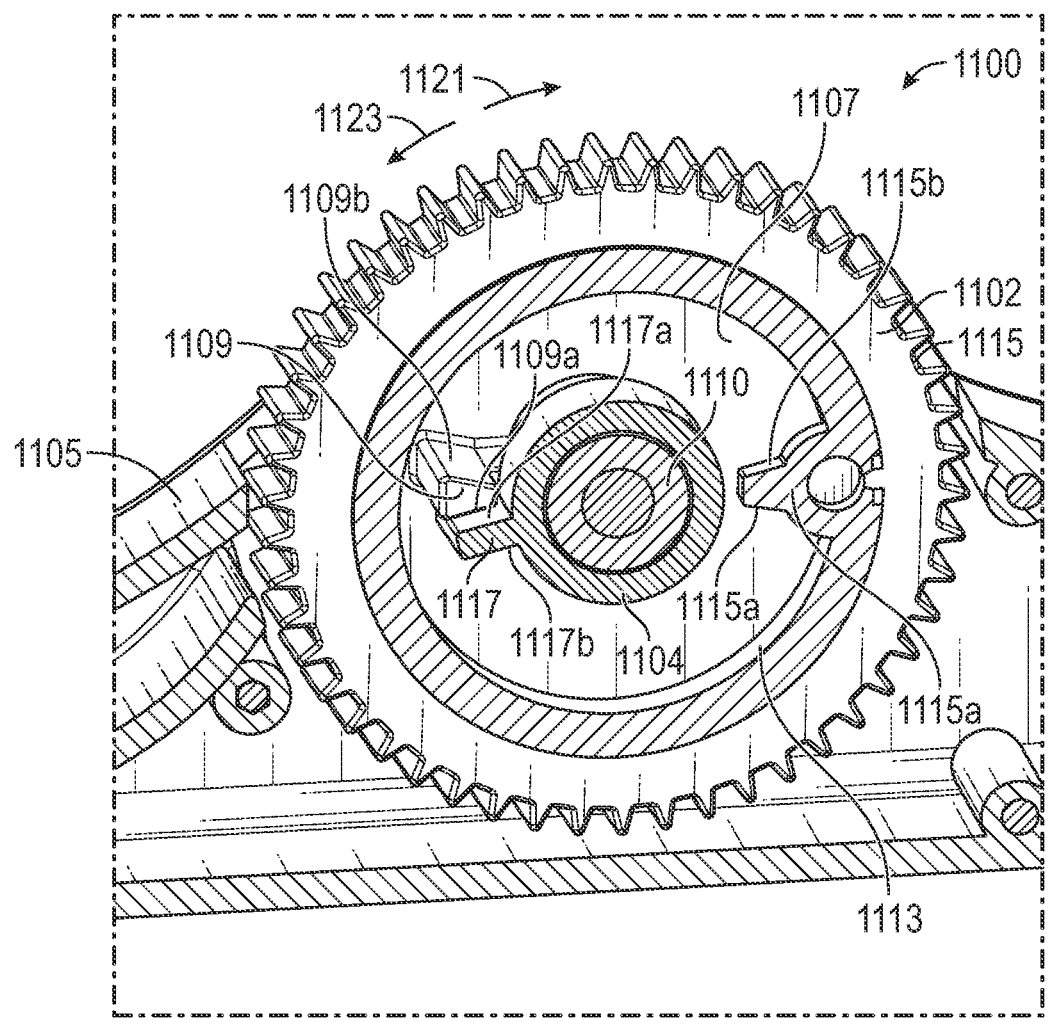
FIG. 11B is a cross-sectional side view of the probe delivery device of FIG. 11A, illustrating an example first wheel rotated independently from an example second wheel in a second direction from the first configuration, according to some embodiments.
Figure 11C:
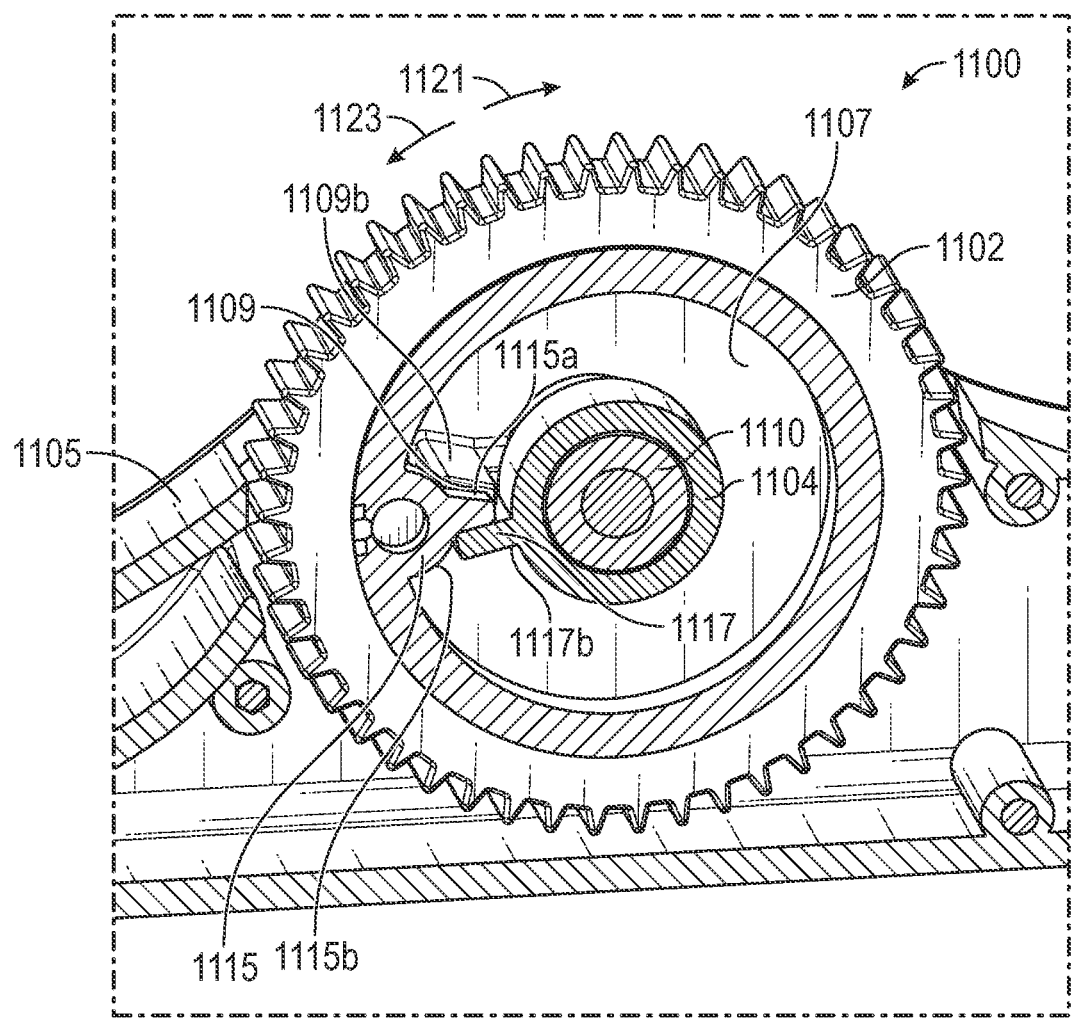
FIG. 11C is a cross-sectional side view of the probe delivery device of FIG. 11A, illustrating the first wheel rotated further in the second direction from the position of FIG. 11B, according to some embodiments.
Figure 11D:
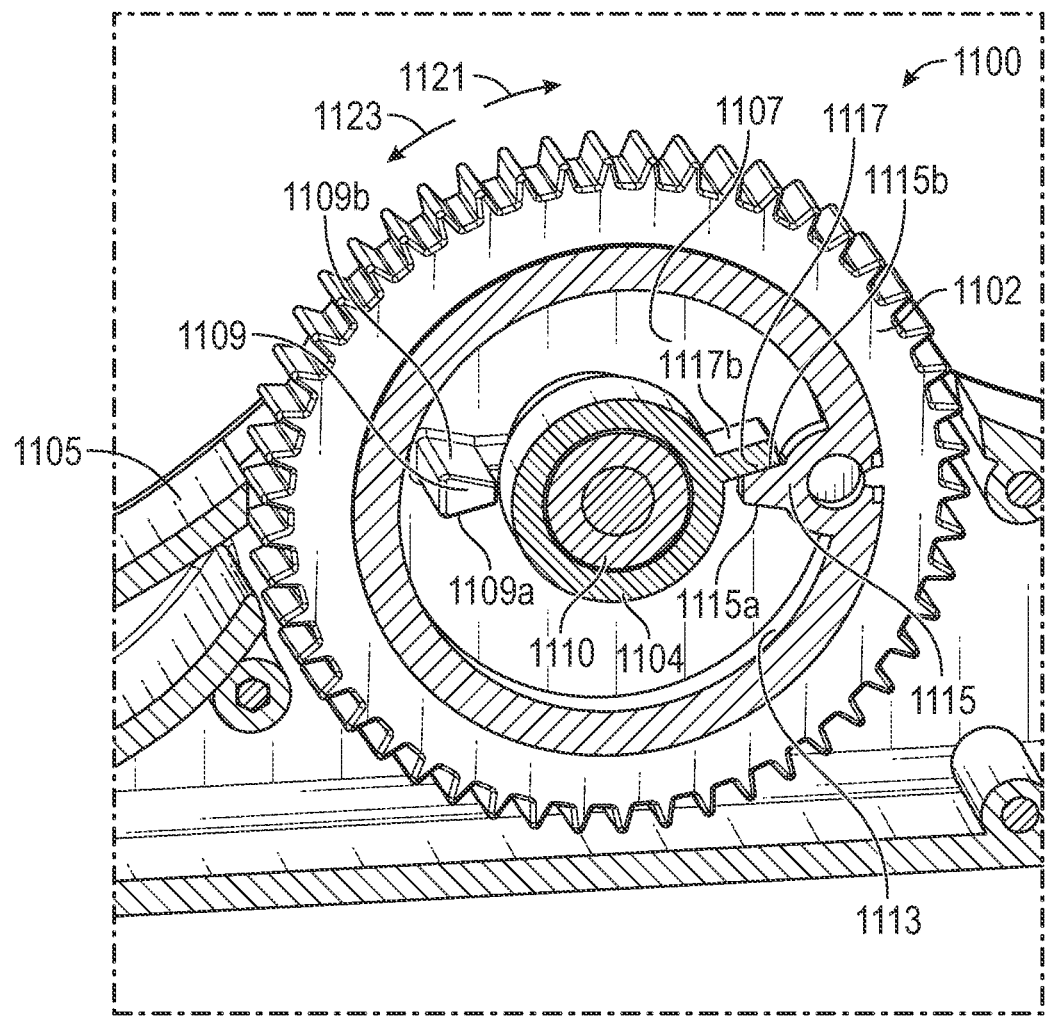
FIG. 11D is a cross-sectional side view of the probe delivery device of FIG. 11A, illustrating the first wheel and the second wheel rotated together in the second direction from the position of FIG. 11C, according to some embodiments.
Figure 11E:
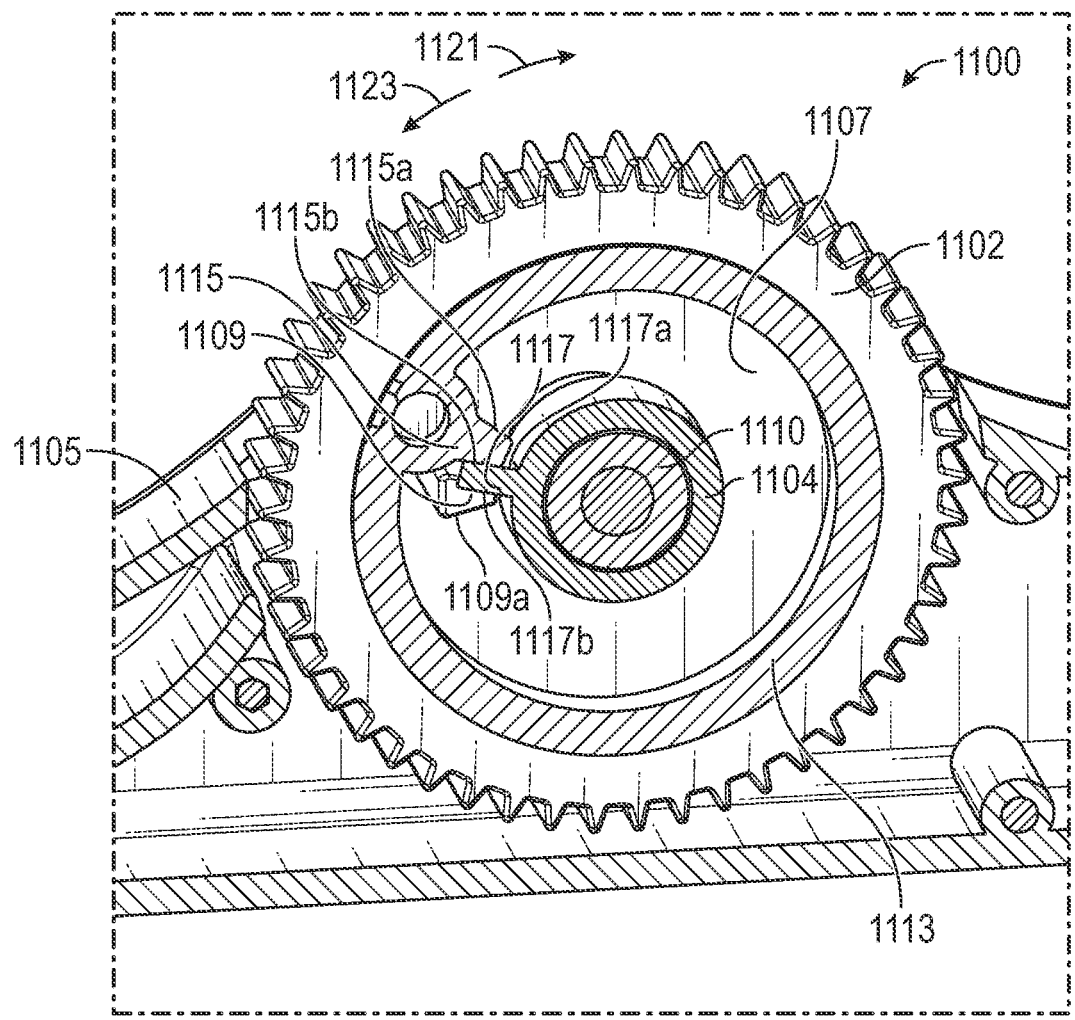
FIG. 11E is a cross-sectional side view of another probe delivery device, illustrating the probe delivery device in a second configuration, according to some embodiments.
Figure 12A:
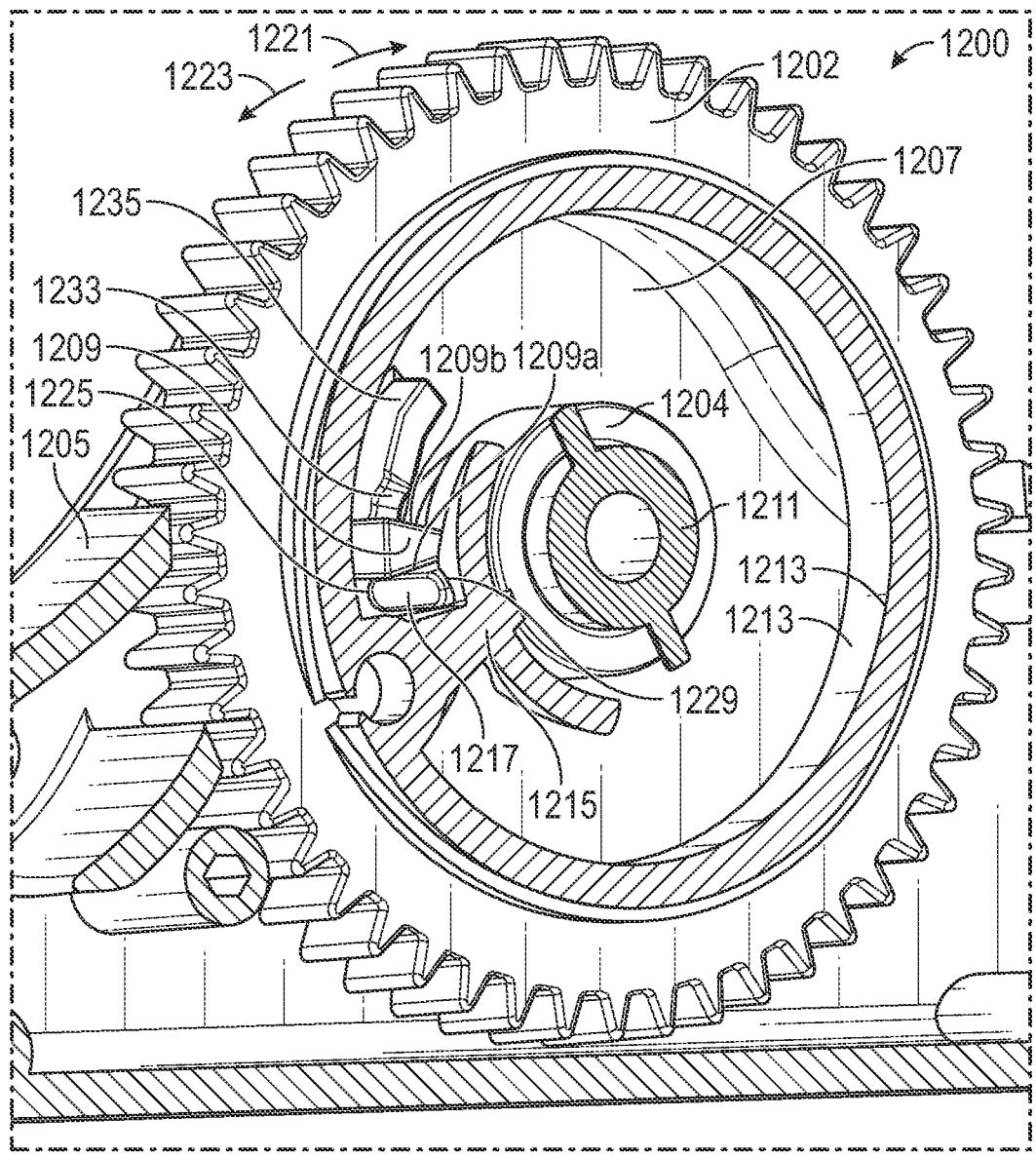
FIG. 12A is a cross-sectional front view of another probe delivery device, illustrating the probe delivery device in a first configuration, according to some embodiments.
Figure 12B:
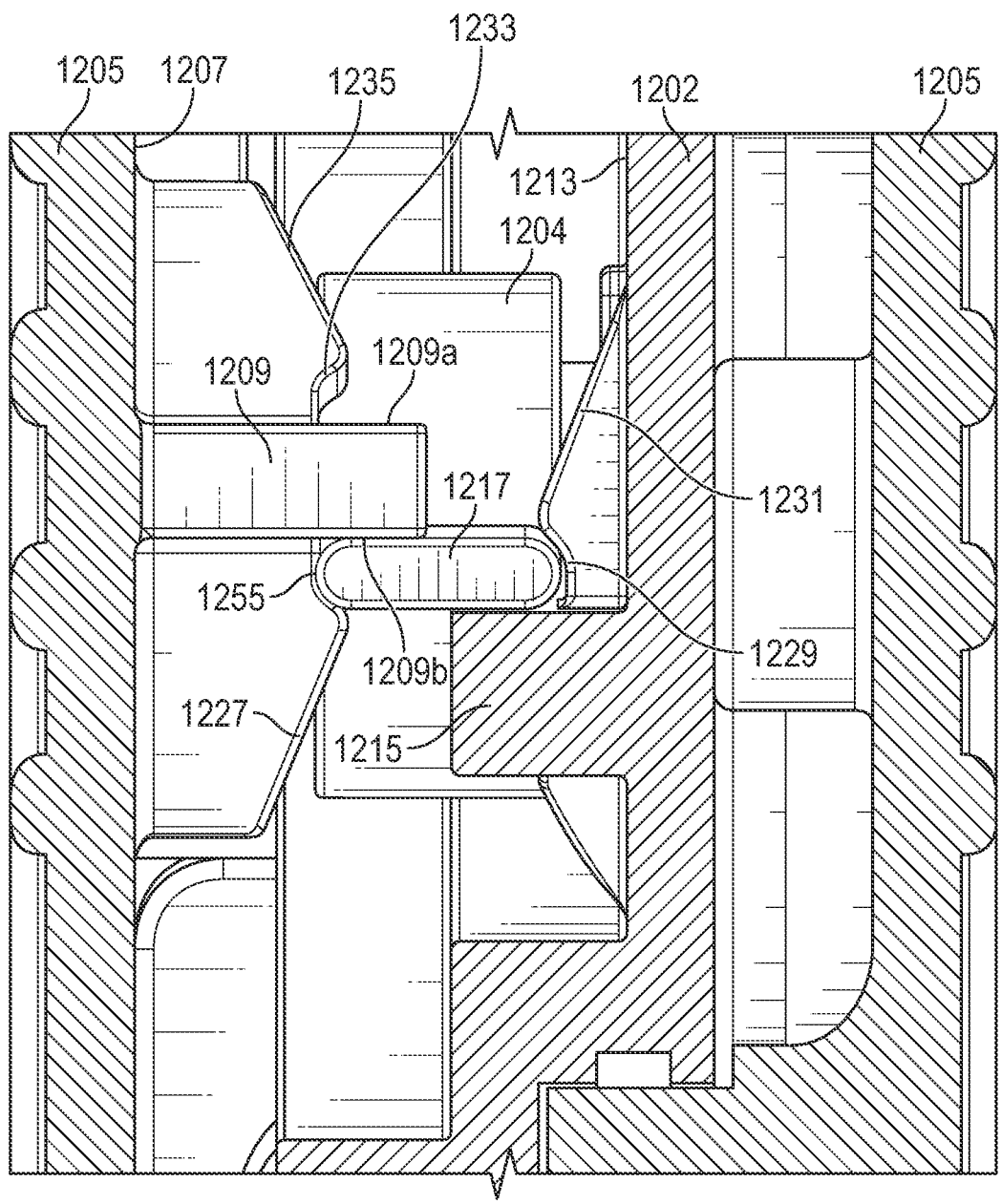
FIG. 12B is a cross-sectional front view of the probe delivery device of FIG. 12A, illustrating the probe delivery device in the first configuration, according to some embodiments.
Figure 12C:
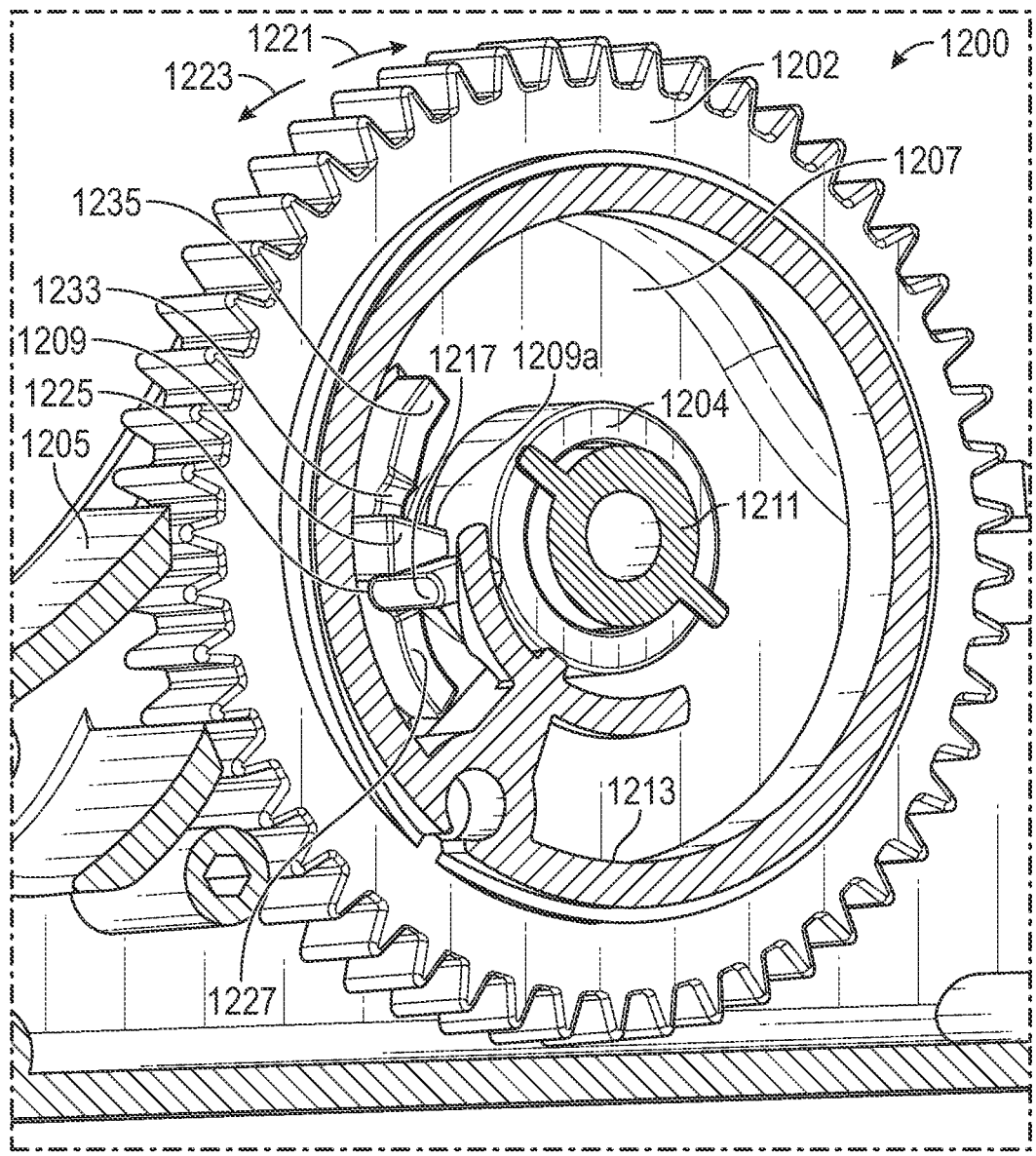
FIG. 12C is a cross-sectional side view of the probe delivery device of FIG. 11A, illustrating an example first wheel rotated independently from an example second wheel in a second direction from the first configuration, according to some embodiments.
Figure 12D:
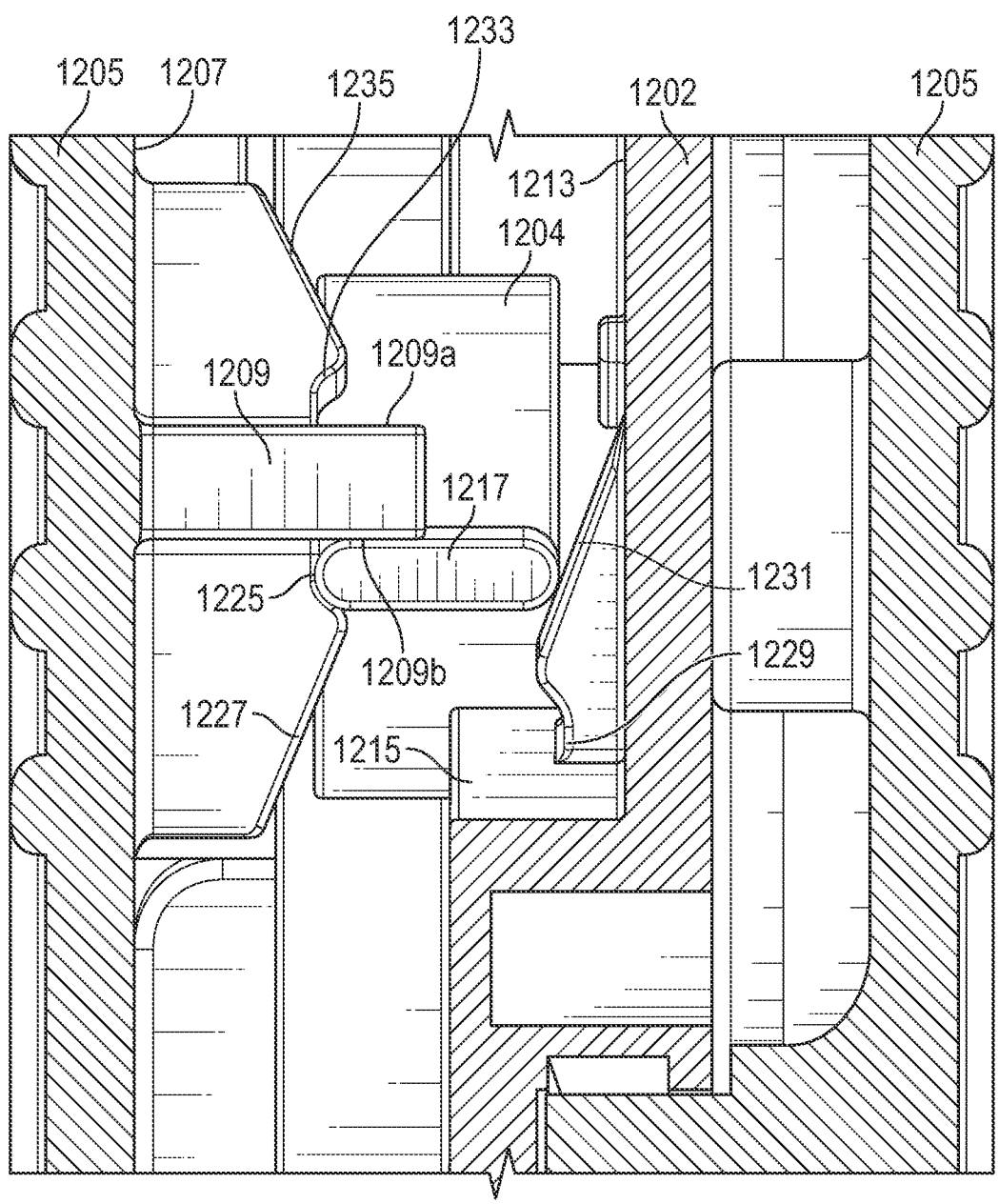
FIG. 12D is a cross-sectional front view of the probe delivery device of FIG. 12A, illustrating the first wheel rotated independently from the second wheel in the second direction from the first configuration, according to some embodiments.
Figure 12E:
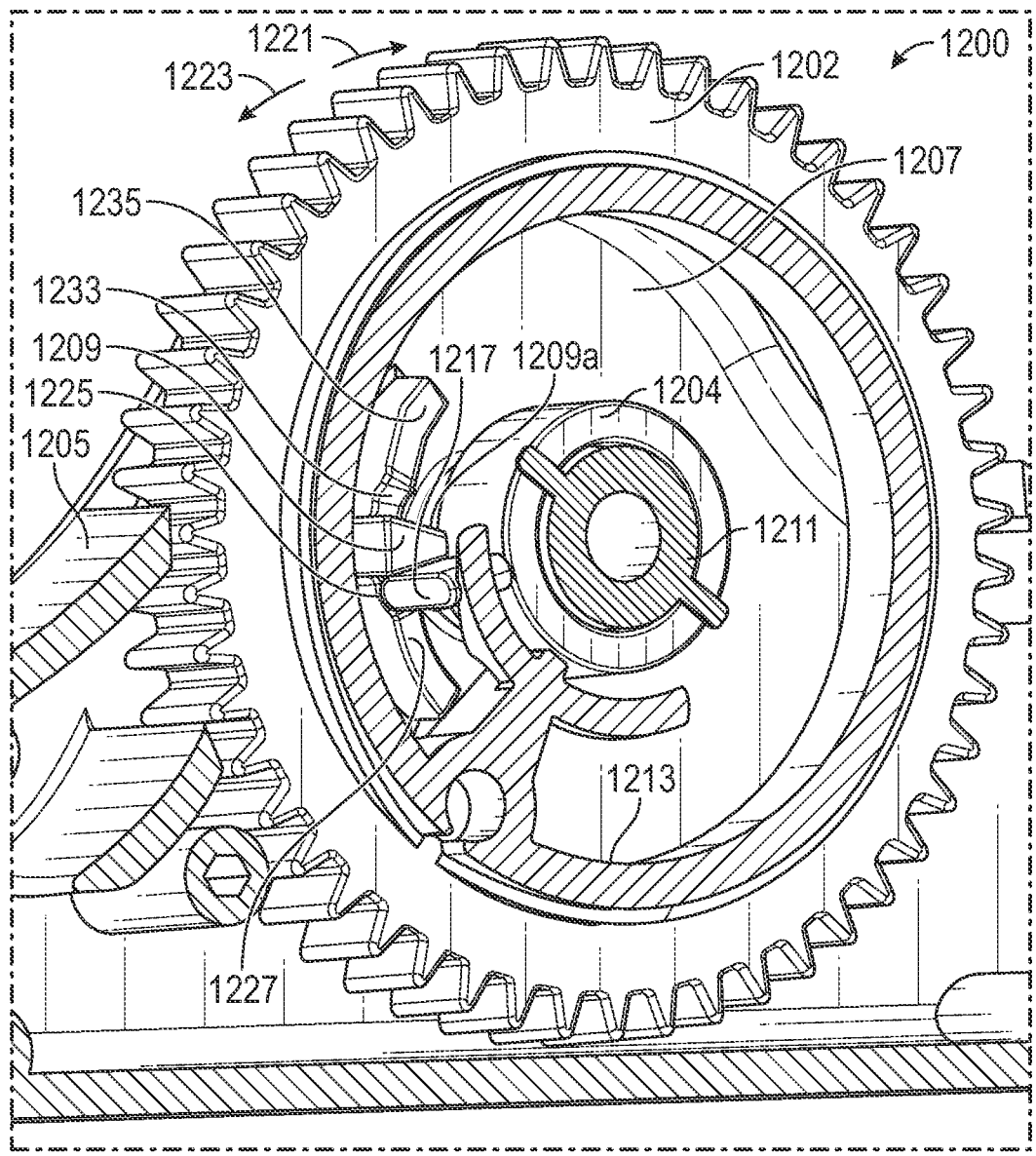
FIG. 12E is a cross-sectional side view of the probe delivery device of FIG. 11A, illustrating an example tab moved towards the first wheel, according to some embodiments.
Figure 12F:
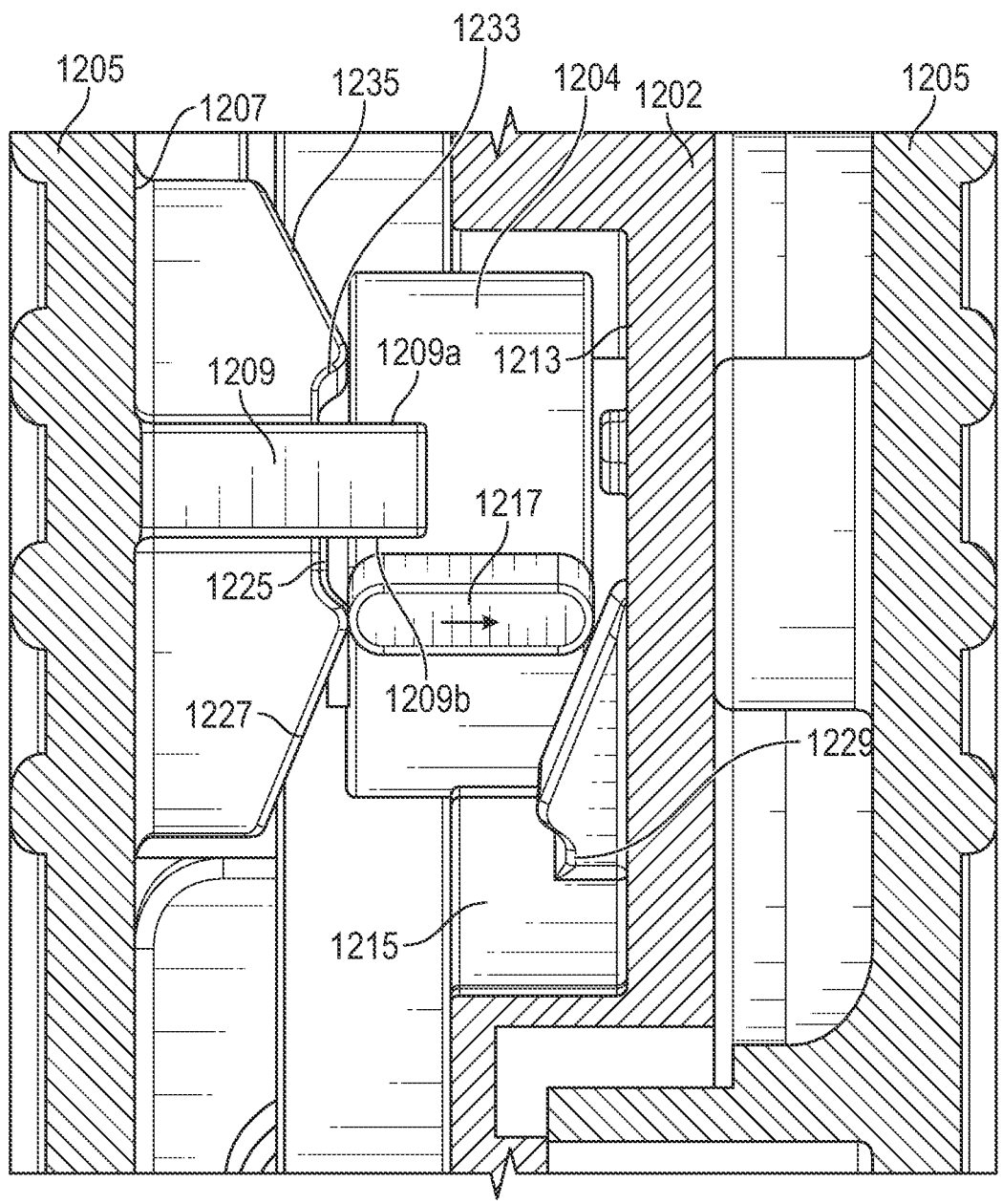
FIG. 12F is a cross-sectional front view of the probe delivery device of FIG. 12A, illustrating the tab moved towards the first wheel, according to some embodiments.
Figure 12G:
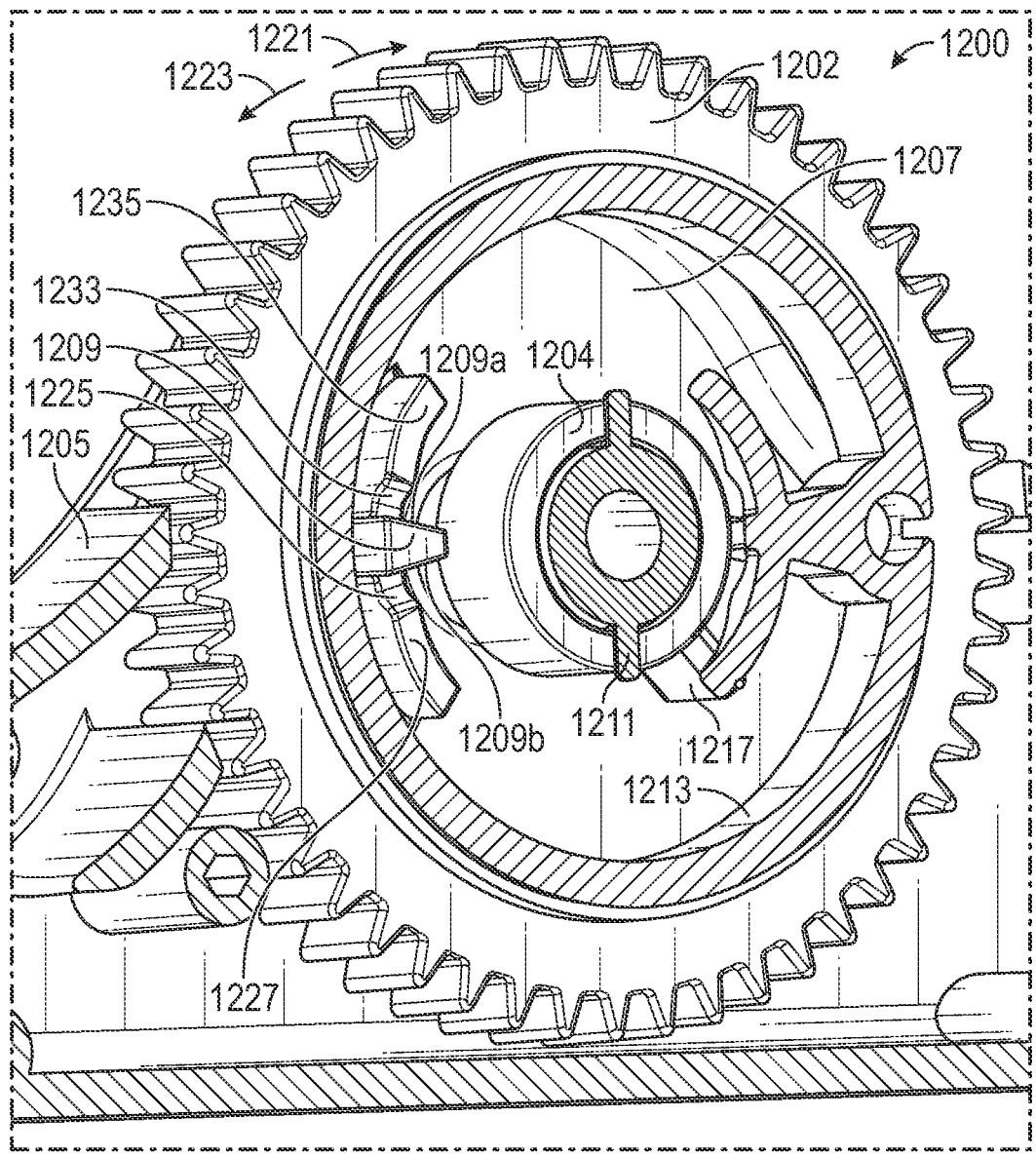
FIG. 12G is a cross-sectional side view of the probe delivery device of FIG. 12A, illustrating the tab and the first wheel rotated in the second direction from the position of FIG. 12E-12F, according to some embodiments.
Figure 12H:
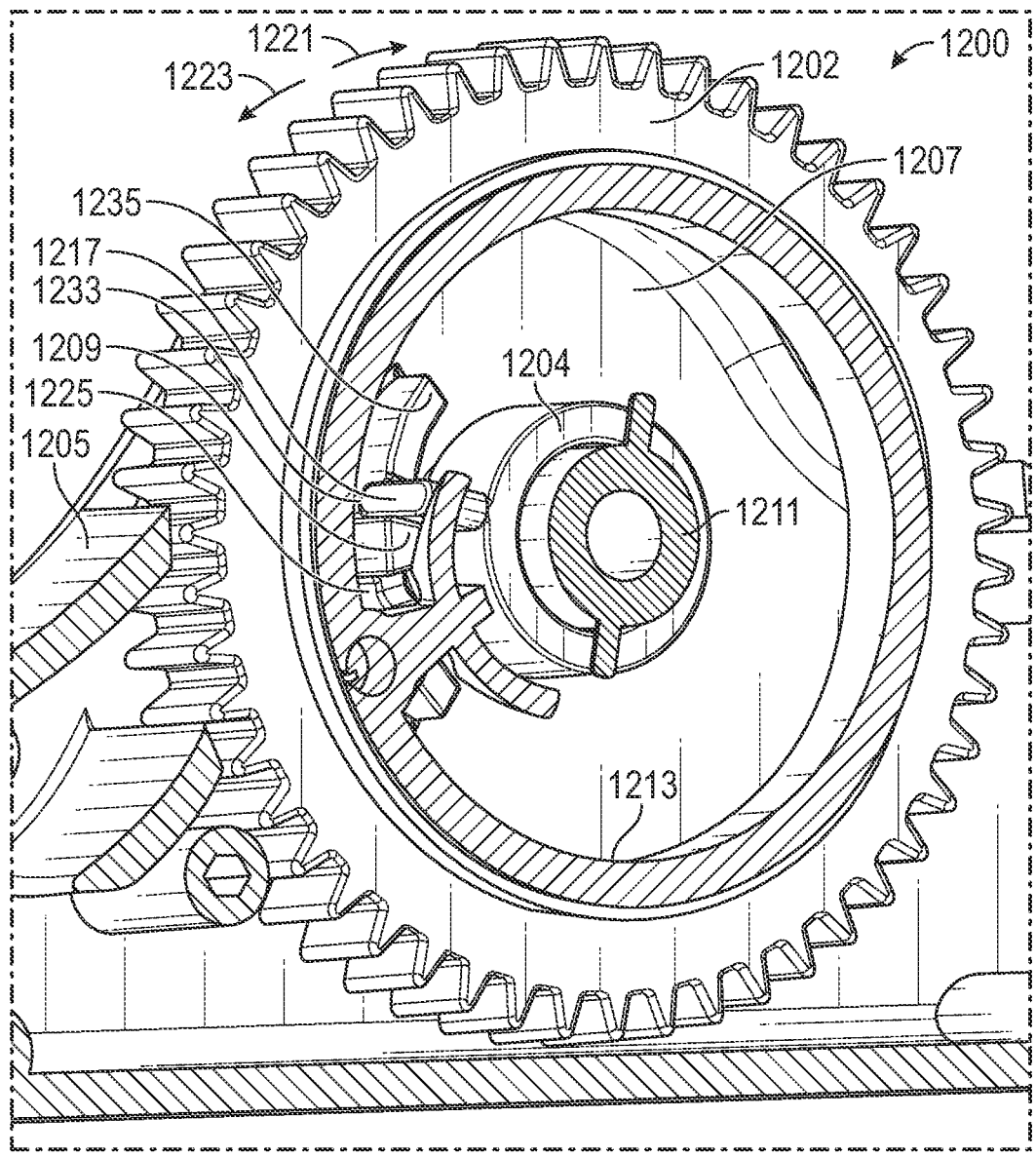
FIG. 12H is a cross-sectional side view of the probe delivery device of FIG. 12A, illustrating the tab and the first wheel rotated further in the second direction from the position of FIG. 12G, according to some embodiments.
Figure 12I:
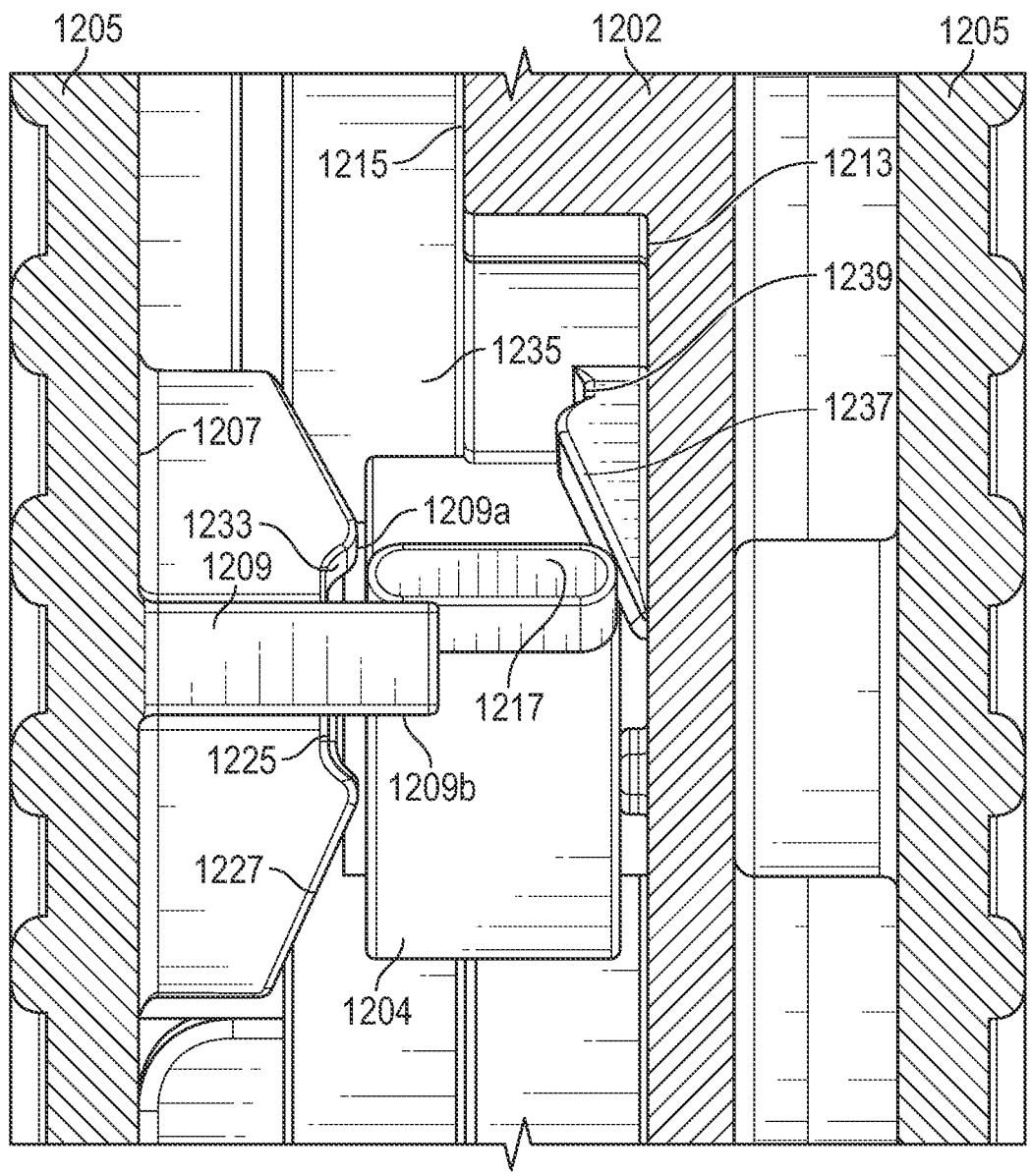
FIG. 12I is a cross-sectional front view of the probe delivery device of FIG. 12A, illustrating the tab and the first wheel rotated further in the second direction from the position of FIG. 12G, according to some embodiments.
Figure 12J:
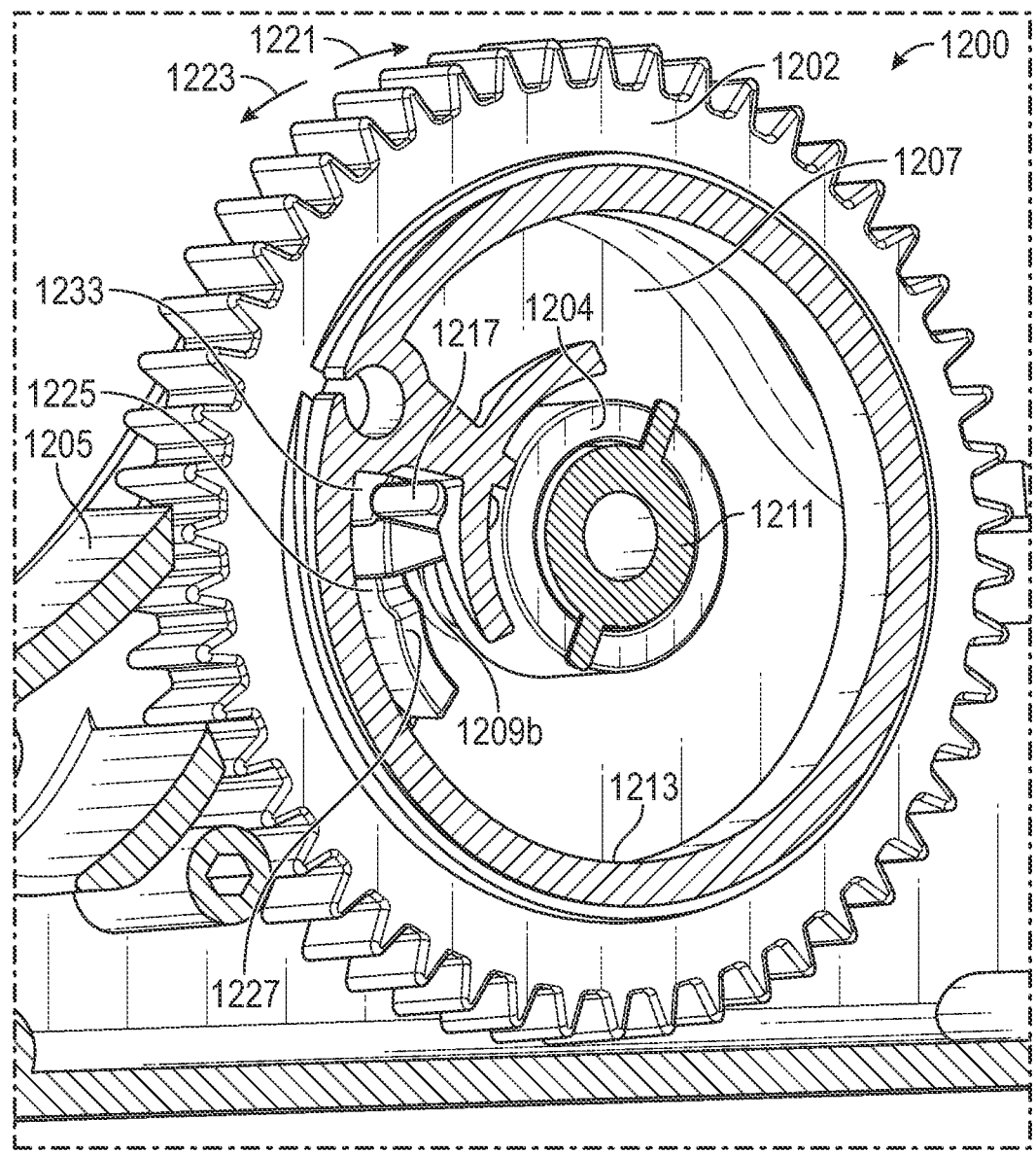
FIG. 12J is a cross-sectional side view of the probe delivery device of FIG. 12A, illustrating the probe delivery device in a second configuration, according to some embodiments.
Figure 12K:
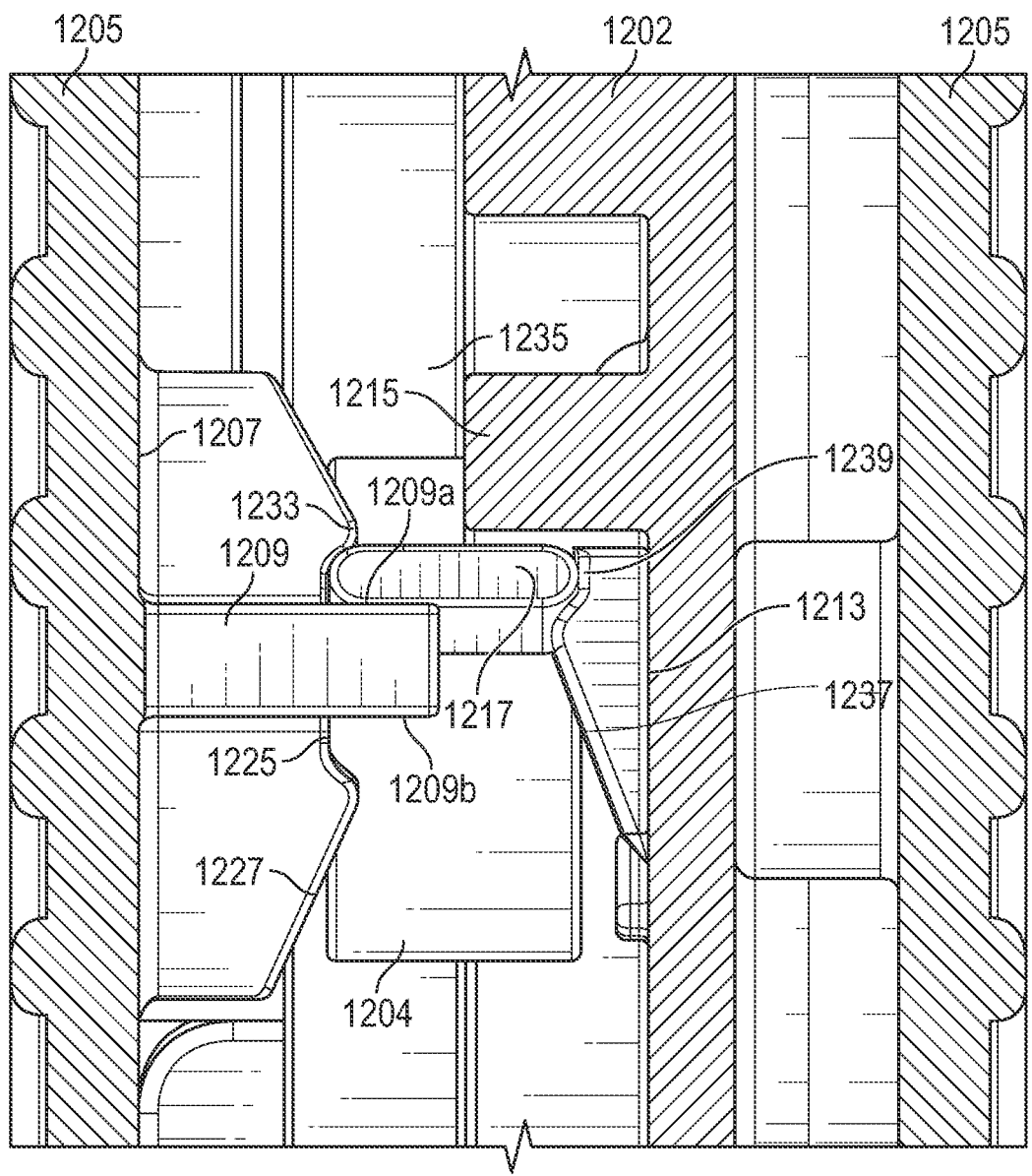
FIG. 12K is a cross-sectional front view of the probe delivery device of FIG. 12A, illustrating the probe delivery device in a second configuration, according to some embodiments.

In some embodiments, FIG. 11B illustrates the first wheel 1102 rotating in the second direction 1123 independently from the first configuration. In some embodiments, the first wheel 1102 may rotate in the second direction 1123 independently from the first configuration until the first side 1115*a* of the first wheel stop member 1115 contacts the first side 1117*a* of the tab 1117, as illustrated in FIG. 11C, for example. In some embodiments, FIG. 11D illustrates the first wheel 1102 and the second wheel 1104 may rotate together further in the second direction 1123, as illustrated in FIG. 11D, for example. In some embodiments, the first wheel 1102 and the second wheel 1104 may rotate together until the second side 1117*b* of the tab 1117 contacts the second side 1109*b* of the housing stop member 1109, as illustrated, for example, in FIG. 11E, preventing further rotation in the second direction 1123.

In some embodiments, the first wheel 1102 may be configured to rotate almost two full turns, from the first configuration to the second configuration. In is understood that in some embodiments, the probe delivery device 1100 one or more other wheels that operate in a similar fashion to the second wheel 1104 to each allow almost another full turn of the first wheel 1102. In these embodiments, the one or more other wheels may be disposed between the second wheel 1104 and the housing stop member 1109.

In some embodiments, the first wheel 1102 may extend out from the housing 1105, which may facilitate turning of the first wheel 1102 by a digit of the clinician. In some embodiments, in order to advance the probe, the clinician may rotate the portion of the first wheel 1102 exposed from the housing 1105 toward the distal end 1100*a* of the housing 1105 or in the second direction 1123 to advance the probe distally. In some embodiments, the clinician may rotate the portion of the first wheel 1102 exposed from the housing 1105 away from the distal end 1100*a* of the housing 1105 or in the first direction 1121 to retract the probe proximally.

It is understood, however, in some embodiments, positions of the housing stop member 1109 and the first wheel stop member 1115 may be reversed. In these embodiments, the clinician may rotate the portion of the first wheel 1102 exposed from the housing 1105 away from the distal end 1100a of the housing 1105 or in the first direction 1121 to advance the probe distally and/or the clinician may rotate the portion of the first wheel 1102 exposed from the housing 1105 away from the distal end 1100a of the housing 1105 or in the first direction 1121 to retract the probe proximally. In some embodiments, a location of the housing stop member 1109, the tab 1117, and the first wheel stop member 1115 in the first configuration may vary.

In some embodiments, additional geometry can be added to the first wheel 1102 and/or housing 1105 so there would be a detent at a beginning and/or an end of rotation or travel of the first wheel 1102. In some embodiments, multiple detents may act against the second wheel 1104, and the second wheel 1104 may slide axially to allow one detent to act at a time. The additional geometry may include different ramp angles to encourage one ramp to act before the other. An example the additional geometry is illustrated in FIG. 12.

FIGS. 12A-12K illustrate another example of a probe delivery device 1200, in accordance with some embodiments. In some embodiments, the probe delivery device 1200 may be similar or identical to one or more of the following in terms of one or more features and/or operation: the probe delivery device 100, the probe delivery device 200, the probe delivery device 300, the probe delivery device 400, the probe delivery device 500, the probe delivery device 600, the probe delivery device 700, the probe delivery device 800, the probe delivery device 900, the probe delivery device 1000, and the probe delivery device 1100. In some embodiments, the probe delivery device 1200 may be moved from a position of FIGS. 12A/12B to FIG. 12C/12D to FIG. 12E/12F to FIG. 12G to FIG. 12H/12I to FIG. 12J/12K.

In some embodiments, the probe delivery device 1200 may include a first wheel 1202 and a second wheel 1204. In some embodiments, the first wheel 1202 of the probe delivery device 1200 may include or correspond to the advancement wheel 152 of FIG. 1, the spool 155 of FIG. 1, the spool 251 of FIG. 2, the spool 351 of FIG. 3, the spool 451 of FIG. 4, the advancement wheel 552 of FIG. 5, the first guide wheel 555 of FIG. 5, the pinion 655 of FIG. 6, the advancement wheel 752 of FIG. 7, the advancement wheel 1052 of FIG. 10, or the first wheel 1102 of FIG. 11.

In some embodiments, the probe delivery device 1200 may include a housing 1205, which may include a distal end and a proximal end. In some embodiments, the distal end of the housing 1205 may be configured to couple to an intravenous catheter device. In some embodiments, the housing 1205 of the probe delivery device 1200 may include or correspond to the housing 105 of FIG. 1, the housing 205 of FIG. 2, the housing 305 of FIG. 3, the housing 405 of FIG. 4, the housing 505 of FIG. 5, the housing 605 of FIG. 6, the housing 705 of FIG. 7, the housing 805 of FIG. 8, the housing 1005 of FIG. 10, or the housing 1105 of FIG. 11.

In some embodiments, an inner surface 1207 of the housing 1205 may include a housing stop member 1209, which may include a protrusion. In some embodiments, the housing stop member 1209 may include a first side 1209a and a second side 1209b, which may be opposite the first side 1209a.

In some embodiments, the probe delivery device 1200 may include an axle 1211, and the first wheel 1202 may be configured to rotate with the axle 1211, which may be concentric with the first wheel 1202. In some embodiments, an inner surface 1213 of the first wheel 1202 may include a first wheel stop member 1215, which may include a protrusion. In some embodiments, a gap may be disposed between the housing stop member 1209 and the first wheel stop member 1215. In some embodiments, the second wheel 1204 may include a tab 1217 configured to bridge the gap between the housing stop member 1209 and the first wheel stop member 1215. In some embodiments, the second wheel 1204 may be disposed on the axle 1211. In some embodiments, the second wheel 1204 may be configured to rotate with the axle 1211 and move axially along the axle 1211.

In some embodiments, the probe delivery device 1200 may include a probe. In some embodiments, the probe delivery device 1200 may include a probe. In some embodiments, the housing probe of the probe delivery device 1100 may include or correspond to the probe 153 of FIG. 1, the probe 253 of FIG. 2, the probe 353 of FIG. 3, the probe 453 of FIG. 4, the probe 553 of FIG. 5, the probe 653 of FIG. 6, the probe 753 of FIG. 7, the probe 853 of FIG. 8, or the probe 1053 of FIG. 10. In some embodiments, the probe may include a wire constructed of nickel titanium or another suitable material. In some embodiments, the first wheel 1202 may be configured to rotate to advance the probe 1219 in a distal direction through the distal end of the housing 1205. In some embodiments, the first wheel 1202 may be configured to rotate more than one full turn.

In some embodiments, the inner surface 1207 of the housing 1205 may include a housing detent 1225. In some embodiments, the inner surface 1207 of the housing 1205 may include a housing ramped surface 1127. In some embodiments, the housing detent 1225 may be disposed between the housing stop member 1209 and the housing ramped surface 1227. In some embodiments, the inner surface 1213 of the first wheel 1202 may include a first wheel detent 1229. In some embodiments, the inner surface 1213 may include a first wheel ramped surface 1231. In some embodiments, the first wheel detent 1229 may be disposed between the first wheel stop member 1215 and the first wheel ramped surface 1231.

In some embodiments, in response to the probe delivery device 1200 being disposed in a first configuration, the tab 1217 may be disposed within the housing detent 1225 and the first wheel detent 1229 and the first wheel 1202. In these embodiments, the first wheel 1202 may be prevented from rotating in a first direction 1221 but may be configured to rotate in a second direction 1223 opposite the first direction 1221. In some embodiments, the first wheel 1202 may be configured to rotate more than one full turn in the second direction 1223. In some embodiments, the housing detent 1225 may be disposed across from the first wheel detent 1229 in the first configuration.

In some embodiments, the first wheel 1202 may be configured to rotate in the second direction 1223 to advance the probe in the distal direction through the distal end of the housing 1205. In some embodiments, in response to the first wheel 1202 rotating in the second direction from the first configuration, the tab 1217 may be removed from the first wheel detent 1229 before the tab 1217 is removed from the housing detent 1225. In these embodiments, the tab 1217 may be removed from the housing detent 1225 in response to the tab 1217 sliding toward the inner surface 1213 of the first wheel 1202. In some embodiments, the tab 1217 may be removed from the first wheel detent 1229 before the tab 1217 is removed from the housing detent 1225 because the housing detent 1225 may be shallower than the first wheel detent 1229 or have a shallower angle for the tab 1217 to ramp out of the housing detent 1225.

In some embodiments, the housing ramped surface 1227 may be ramped towards the housing detent 1225. In some embodiments, the first wheel ramped surface 1231 may be ramped towards the first wheel detent 1229. In some embodiments, the housing ramped surface 1227 and the first wheel ramped surface 1231 may be ramped in differing directions.

In some embodiments, the inner surface 1207 of the housing 1205 may include another housing detent 1233 and/or another housing ramped surface 1235. In some embodiments, the other housing detent 1233 may be disposed between the housing stop member 1209 and the other housing ramped surface 1235 and on an opposite side of the housing stop member 1209 as the housing detent 1225. In some embodiments, in response to the probe delivery device 1200 being disposed in the second configuration, the tab 1217 may be disposed within the other housing detent 1233 and another first wheel detent 1239.

In some embodiments, the first wheel 1202 may be configured to rotate from the first configuration to the second configuration, and the tab 1217 may be disposed within the other housing detent 1233 and the other first wheel detent 1239 in the second configuration. In some embodiments, in order to move from the first configuration to the second configuration, the tab 1217 may contact the housing stop member 1209. In some embodiments, in response to the tab 1217 contacting the housing stop member 1209 and further rotation of the first wheel 1202 in the second direction, the tab 1217 may move along another first wheel ramped surface 1237 and may be pushed by the other first wheel ramped surface 1237 towards the inner surface 1207 of the housing 1205 and into the other housing detent 1233.

In some embodiments, when the tab 1217 may snap into and/or snap out of the housing detent 1225, the other housing detent 1233, and the first wheel detent 1229, which may provide resistance to movement or rotation. In some embodiments, one or more of the housing ramped surface 1227, the first wheel ramped surface 1231, and the other housing ramped surface 1235 may facilitate guidance of the tab 1217 and the second wheel 1204 and may move the second wheel 1204 axially along the axle 1211.

In some embodiments, in response to the first wheel 1202 and the second wheel 1204 moving in the second direction 1223 from the first configuration to the second configuration, the tab 1217 may contact the housing stop member 1209. In some embodiments, in response to the tab 1217 contacting the housing stop member 1209 and further rotation of the first wheel 1202 in the second direction 1223, the tab 1217 may move along other first wheel ramped surface 1237 and is pushed by the other first wheel ramped surface 1237 into the other housing detent 1233. In some embodiments, when the tab 1217 is inserted into the other housing detent 1233, it may snap into other first wheel detent 1239. In some embodiments, the other first wheel ramped surface 1231 may be ramped towards the first wheel detent 1229 and may facilitate guidance of the tab 1217.

In some embodiments, as illustrated in FIG. 12, the inner surface 1207 of the housing 1205 may include the other housing detent 1233. It is understood that in some embodiments, the probe delivery device 1200 may be modified such that the tab 1217 snaps out of the housing detent 1225 first, prior to snapping out of the first wheel detent 1229. In these embodiments, the first wheel 1202 may include the other housing detent 1233 and/or the other ramped surface 1235, which may be disposed on an opposite side of the first wheel stop member 1215 as the first wheel detent 1229. In these embodiments, a particular arrangement on the inner surface 1207 of one or more of the housing ramped surface 1227, the other ramped surface 1235, the housing stop member 1209, the housing detent 1225, stop member, and the other housing detent 1233 illustrated in FIG. 12 may instead be disposed on the inner surface of the first wheel 1202. In these embodiments, one or more of the first wheel ramped surface 1231, the other first wheel ramped surface 1237, the first wheel stop member 1215, the first wheel detent 1229, and the other first wheel detent 1239 may instead be disposed on the inner surface 1207 of the housing 1205. In some embodiments, in the second configuration, the tab 1217 may be disposed within the other housing detent 1233 on the inner surface 1213 of the first wheel and one of the housing detent and the first wheel detent. In these and other embodiments, the first direction 1221 and the second direction 1223 may be reversed.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A probe delivery device for delivering a probe, comprising:
    a housing, comprising a distal end and a proximal end, wherein the distal end is configured to couple to an intravenous catheter device, wherein an inner surface of the housing comprises a housing stop member;
    a first wheel, wherein an inner surface of the first wheel comprises a first wheel stop; and
    a second wheel, wherein the second wheel comprises a tab,
    wherein the first wheel and the second wheel are rotatable in a first direction and a second direction to transition the probe between a first configuration where the probe is in a fully retracted position and a second configuration where the probe is in a fully advanced position, and
    wherein in response to the probe delivery device being disposed in the first configuration, the first wheel and the second wheel are prevented from rotating in the first direction but are configured to rotate in the second direction opposite the first direction, wherein the first wheel is configured to rotate more than one full turn in the second direction.

2. The probe delivery device of claim 1, wherein in response to the probe delivery device being disposed in the first configuration, a gap is disposed between the housing stop member and the first wheel stop and the tab bridges the gap between the housing stop and the first wheel stop.

3. The probe delivery device of claim 1, wherein in response to the probe delivery device being disposed in the first configuration, the tab is disposed between the housing stop member and the first wheel stop and contacts the housing stop member and the first wheel stop, wherein in response to the probe delivery device being disposed in the first configuration, the first wheel is configured to rotate independent from the housing and the second wheel in the second direction until the first wheel stop contacts the tab.

4. The probe delivery device of claim 3, wherein in response to the first wheel rotating independent from the housing and the second wheel in the second direction until the first wheel stop contacts the tab, the first wheel and the second wheel are configured to rotate together further in the second direction until the probe delivery device is disposed in the second configuration, wherein in the second configuration, the tab is disposed between the housing stop member and the first wheel stop and contacts the housing stop member and the first wheel stop.

5. The probe delivery device of claim 4, wherein the first wheel is configured to rotate in the second direction to advance the probe in a distal direction through the distal end of the housing.

\* \* \* \* \*